US012775550B2

(12) United States Patent
Liu et al.

(10) Patent No.: US 12,775,550 B2
(45) Date of Patent: Oct. 27, 2026

(54) METHODS OF OPERATING MEMORY, MEMORIES, AND MEMORY SYSTEMS

(71) Applicant: Yangtze Memory Technologies Co., Ltd., Wuhan (CN)

(72) Inventors: YanLan Liu, Wuhan (CN); Bo Li, Wuhan (CN); Zhijiu Zhu, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 19/011,566

(22) Filed: Jan. 6, 2025

(65) Prior Publication Data

US 2026/0037427 A1 Feb. 5, 2026

(30) Foreign Application Priority Data

Jul. 31, 2024 (CN) ......................... 202411046408.2

(51) Int. Cl.
*G06F 12/02* (2006.01)

(52) U.S. Cl.
CPC ................................ *G06F 12/0246* (2013.01)

(58) Field of Classification Search
CPC .................................................. G06F 12/0246
See application file for complete search history.

(56) References Cited

U.S. PATENT DOCUMENTS 11,133,077 B2 9/2021 Deng et al.
11,657,861 B2 5/2023 Rao et al.
11,756,629 B2 9/2023 Deng et al.
11,763,892 B2 9/2023 Deng et al.
11,776,641 B2 10/2023 Deng et al.
2021/0203496 A1 * 7/2021 Cariello .............. G06F 12/1441

OTHER PUBLICATIONS

Introduction to Microcontrollers Second Edition (Year: 2004).*
Microcontroller programming an introduction. (Year: 2012).*
What's a microcontroller? Student Guide v2.2. (Year: 2004).*

* cited by examiner

*Primary Examiner* — Jason W Blust
(74) *Attorney, Agent, or Firm* — Hanley, Flight & Zimmerman, LLC

(57) ABSTRACT

The present disclosure provides methods of operating a memory, memories, and memory systems. An example memory includes a peripheral circuit including a first micro-control circuit, a second micro-control circuit, and a third micro-control circuit. The method includes: in response to executing a first operating instruction, sending, by the first micro-control circuit, a first signal to the second micro-control circuit; in response to the first signal, executing, by the second micro-control circuit, a second operating instruction; sending, by the second micro-control circuit, a second signal to the third micro-control circuit; and in response to the second signal, executing, by the third micro-control circuit, a third operating instruction.

20 Claims, 17 Drawing Sheets

METHODS OF OPERATING MEMORY, MEMORIES, AND MEMORY SYSTEMS

CROSS-REFERENCE TO RELATED APPLICATIONS

This application claims priority to and the benefit of Chinese Patent Application 202411046408.2, filed on Jul. 31, 2024, which is hereby incorporated by reference in its entirety.

TECHNICAL FIELD

The present disclosure relates to the technical field of memories, and particularly to methods of operating memory, memories, and memory systems.

BACKGROUND

Flash memory is a widely used non-volatile memory that can be electrically erased and reprogrammed. Flash memory types include NOR flash memory and NAND flash memory. A threshold voltage of a memory cell in the flash memory may be changed to a desired level to perform read, program, and erase operations. For the NAND flash memory, the erase operation can be performed at a block level, and the program operation or read operation can be performed at a page level.

An example memory includes a memory cell array and a peripheral circuit coupled to the memory cell array. The peripheral circuit includes a control logic. The control logic can perform a program operation, a read operation or an erase operation on a memory cell according to a command input to the memory.

BRIEF DESCRIPTION OF THE DRAWINGS

The above-mentioned and other objects, features, and advantages of the present disclosure will become more apparent by describing examples thereof in detail with reference to the drawings.

DETAILED DESCRIPTION

Figure 1:
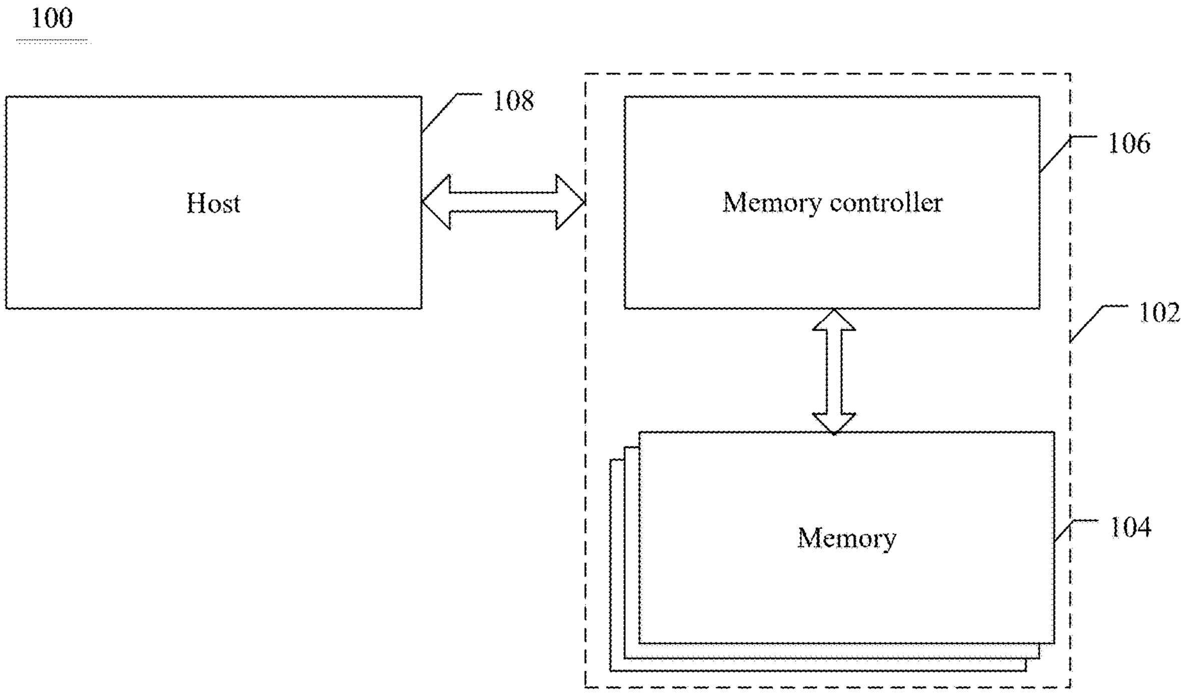
FIG. 1 shows a block diagram of an example system having a memory in examples of the present disclosure.

Examples are described more comprehensively with reference to the drawings. However, examples may be implemented in various forms and should not be construed as being limited to the examples set forth herein. In contrast, these examples are provided so that the present disclosure is more comprehensive and complete, and to fully convey the concept of the examples to a person skilled in the art. The drawings are merely schematic illustrations of the present disclosure and are not necessarily drawn to scale. The same reference numbers in the drawings denote same or similar portions, and thus repeated descriptions to them will be omitted.

Furthermore, the described features, structures or characteristics may be combined in any suitable way in one or more examples. In the following descriptions, many specific details are provided to give a full understanding of the examples of the present disclosure. However, a person skilled in the art will realize that the technical solutions of the present disclosure may be practiced with one or more of the particular details described being omitted, or other methods, devices, operations, etc., may be employed. In other cases, well-known structures, methods, devices, implementations, or operations are not shown or described in detail so as to avoid overshadowing and obscuring aspects of the present disclosure.

Furthermore, the terms such as "first" and "second" are used for descriptive purposes only and are not to be construed as indicating or implying relative importance or implicitly specifying the number of technical features indicated. Thus, features defined by "first" and "second" may explicitly or implicitly include one or more of such features. In the description of the present disclosure, "a plurality of" means at least two, for example, two, three, or the like, unless otherwise explicitly specified. The symbol "/" generally indicates that the related objects are in an "or" relationship.

In the present disclosure, unless otherwise clearly specified and limited, the terms "connect" and the like should be interpreted broadly. For example, the term "connect" may be interpreted as being electrically connected or communicating with each other; and the term "connect" may be interpreted as being directly connected, or indirectly connected by means of an intermedia. For those of ordinary skill in the art, specific meanings of the foregoing terms in the present disclosure may be understood based on specific situations.

FIG. 1 shows a block diagram of an example system having a memory in examples of the present disclosure. The system 100 may include a mobile phone, a desktop computer, a laptop computer, a tablet computer, a vehicle computer, a gaming console, a printer, a positioning apparatus, a wearable electronic apparatus, a smart sensor, a virtual reality apparatus, an augmented reality apparatus, or any other suitable electronic apparatus having a memory.

As shown in FIG. 1, the system 100 may include a host 108 and a memory system 102, wherein the memory system 102 has one or more memories 104 and a memory controller 106. The host 108 may be a include (e.g., a central processing unit (CPU)) or a system on chip (SOC) (e.g., an application processor (AP)) of an electronic apparatus. The host 108 may be configured to send or receive data to or from the memory 104.

The memory 104 may be any memory in the present disclosure, for example, a non-volatile memory. The non-volatile memory may be a NAND flash memory (e.g. a three-dimensional (3D) NAND flash memory).

In some examples, the memory controller 106 is coupled to the memory 104 and the host 108, and is configured to control the memory 104. The memory controller 106 can manage data stored in the memory 104 and communicate with the host 108.

In some examples, the memory controller 106 is configured to send a command to the memory 104 to cause the memory 104 to perform a method of operating a memory provided by examples of the present disclosure.

In some examples, the memory controller 106 is designed for operating in a low duty-cycle environment, such as secure digital (SD) cards, Compact Flash (CF) Cards, Universal Serial Bus (USB) flash drives, or other media for use in electronic apparatuses, such as personal computers, digital cameras, mobile phones, etc.

In some examples, the memory controller 106 is designed for operating in a high duty-cycle environment, for example, Solid-State Disks (SSDs) or embedded Multi-Media Cards (eMMCs) which may be used as data memories for mobile apparatuses, such as smartphones, tablets, laptop computers, etc., and enterprise memory arrays. The memory controller 106 may be configured to send a command to the memory 104 to cause the memory 104 to perform operations, such as read, erase, and program operations.

The memory controller 106 may be further configured to manage various functions with respect to data stored or to be stored in the memory 104, including, but not limited to, bad-block management, garbage collection, logical-to-physical address translation, wear leveling, etc.

In some examples, the memory controller 106 is further configured to process error correction codes (ECCs) with respect to the data read from or written to the memory 104. The memory controller 106 may further perform any other suitable functions, for example, formatting the memory 104. The memory controller 106 may communicate with an external apparatus (e.g., the host 108) according to a specific communication protocol. For example, the memory controller 106 may communicate with the external apparatus through at least one of various interface protocols, such as a USB protocol, an MMC protocol, a peripheral component interconnection (PCI) protocol, a PCI-Express (PCI-E) protocol, an advanced technology attachment (ATA) protocol, a Serial-ATA protocol, a Parallel-ATA protocol, a small computer small interface (SCSI) protocol, an enhanced small disk interface (ESDI) protocol, an integrated drive electronics (IDE) protocol, a Firewire protocol, etc.

The memory controller 106 and the one or more memories 104 may be integrated into various types of storage apparatuses, for example, be included in the same package (such as a universal flash storage (UFS) package or an eMMC package). That is to say, the memory system 102 may be implemented and packaged into different types of end electronic products.

Figure 2A:
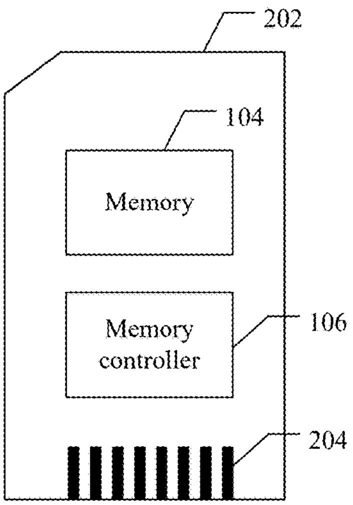
FIG. 2A shows a block diagram of an example memory system.

FIG. 2A shows a block diagram of an example memory system. As shown in FIG. 2A, the memory controller 106 and the single memory 104 may be integrated into a memory card 202. The memory card 202 may include a PC card (also referred to as personal computer memory card international association (PCMCIA) Card), a CF card, a smart media (SM) card, a memory stick, a multimedia card (such as an MMC, an RS-MMC, an MMC micro card, etc.), an SD card (such as an SD card, a mini SD card, a micro SD card, an SDHC card, etc.), a UFS card, etc. The memory card 202 may further include a memory card connector 204 coupling the memory card 202 with a host (e.g., the host 108 in FIG. 1).

Figure 2B:
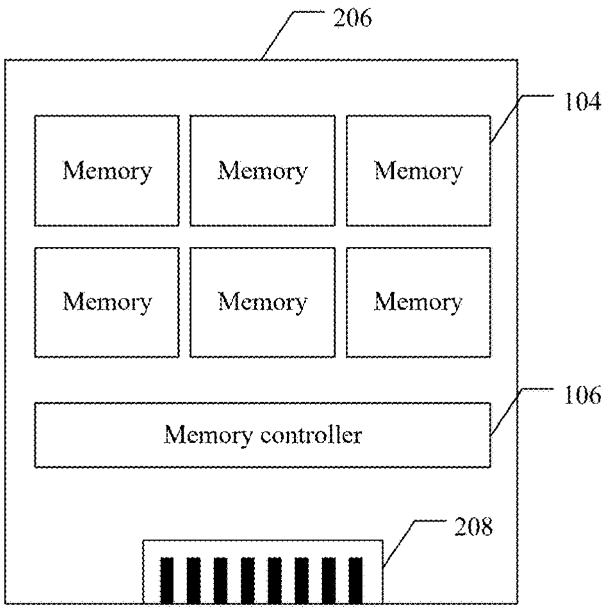
FIG. 2B shows a block diagram of another example memory system.

FIG. 2B shows a block diagram of another example memory system. As shown in FIG. 2B, the memory controller 106 and the plurality of memories 104 may be integrated into the SSD 206. The SSD 206 may further include an SSD connector 208 coupling the SSD 206 with a host (e.g., the host 108 in FIG. 1). In some examples, the storage capacity and/or operation speed of the SSD 206 is greater than those of the memory card 202.

Figure 3:
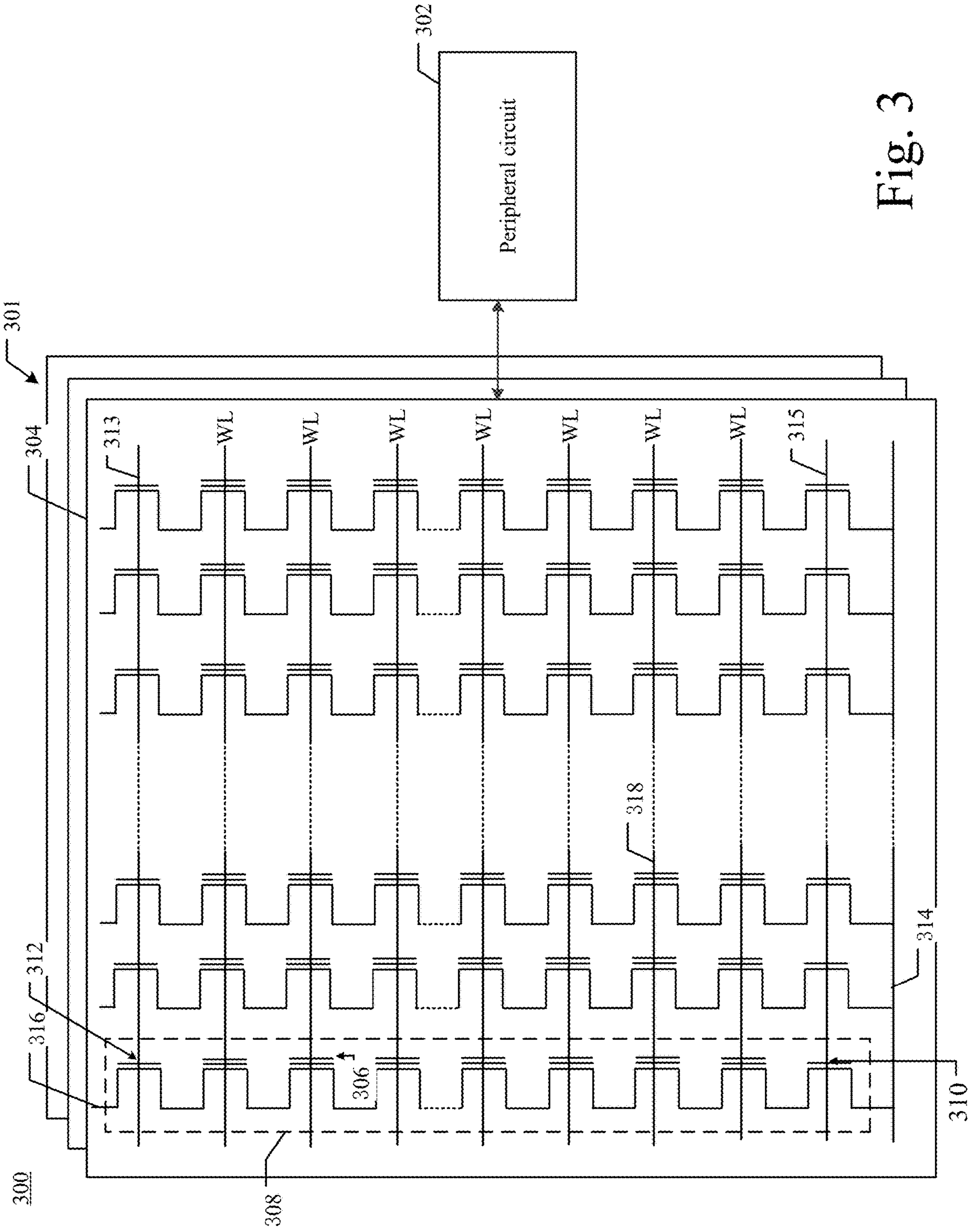
FIG. 3 is a schematic circuit diagram of a memory including a peripheral circuit provided by examples of the present disclosure.

FIG. 3 is a schematic circuit diagram of a memory 300 including a peripheral circuit provided by examples of the present disclosure. The memory 300 may be an example of the memory 104 in FIG. 1. The memory 300 may include a memory cell array 301 and a peripheral circuit 302 coupled to the memory cell array 301. The memory cell array 301 may be a NAND flash memory cell array, wherein memory cells 306 are provided in an array of NAND flash memory strings 308, and each memory string 308 extends vertically above a substrate (not shown).

In some examples, the peripheral circuit 302 is configured to perform an operating method provided by examples of the present disclosure. It can be understood that, the peripheral circuit 302 may be configured to perform the operating method provided by the examples of the present disclosure according to a received command of the memory controller 106.

In some examples, each memory string 308 includes a plurality of memory cells 306 coupled in series and stacked vertically. Each memory cell 306 may keep a continuous analog value, such as voltage or charge, which depends on the number of electrons trapped within a region of the memory cell 306. Each memory cell 306 may be a floating gate type memory cell that includes a floating gate transistor, or a charge trap type memory cell that includes a charge trap transistor.

In some examples, each memory cell 306 may store 1 bit of data, 2 bits of data, or more bits of data, e.g., may be in a Single-Level Cell (SLC) type, a Multi-Level Cell (MLC) type, a Triple-Level Cell (TLC) type, a Quad-Level Cell (QLC) type, or a more advanced type.

As shown in FIG. 3, each memory string 308 may include a Source Select Gate (SSG) 310 at a source terminal thereof and a Drain Select Gate (DSG) 312 at a drain terminal thereof. The SSG 310 and the DSG 312 may be configured to activate a selected memory string 308 during read and program operations.

In some examples, sources of the memory strings 308 in a same block 304 are coupled through a same Source Line (SL) 314 (e.g. a common SL). For example, all the memory strings 308 in the same block 304 have Array Common Sources (ACS). As shown in FIG. 3, the memory strings 308 may be organized into a plurality of blocks 304, and each of the plurality of blocks 304 may have a common source line 314 (e.g., coupled to the ground). In some examples, each block 304 is a basic data unit for an erase operation, e.g., all of the memory cells 306 on the same block 304 are erased at the same time.

In some examples, the DSG 312 of each memory string 308 is coupled to a respective Bit Line (BL) 316, and data may be read from or written to the bit line 316 via an output bus (not shown). Each memory string 308 may be configured to be selected or deselected by applying a select voltage (e.g., above a threshold voltage of a transistor having the DSG 312) or a deselect voltage (e.g., 0 V) to the respective DSG 312 via one or more DSG lines 313 and/or by applying a select voltage (e.g., above a threshold voltage of a transistor having the SSG 310) or a deselect voltage (e.g., 0 V) to the respective SSG 310 via one or more SSG lines 315.

As shown in FIG. 3, the memory cells 306 of the memory string 308 may be coupled through a word line (WL) 318 that selects which row of memory cells 306 is affected by the read and program operations. The peripheral circuit 302 may be coupled to the memory cell array 301 through the bit line 316, the word line 318, the source line 314, the SSG line 315, and the DSG line 313. The peripheral circuit 302 may include any suitable analog, digital, and hybrid signal circuits for facilitating operations of the memory cell array 301 by applying voltage signals and/or current signals to each memory cell 306 serving as an operation target and sensing voltage signals and/or current signals from each memory cell 306 serving as an operation target via the bit line 316, the word line 318, the source line 314, the SSG line 315, and the DSG line 313. The peripheral circuit 302 may include various types of peripheral circuits formed using a Metal-Oxide-Semiconductor (MOS) technology.

Figure 4:
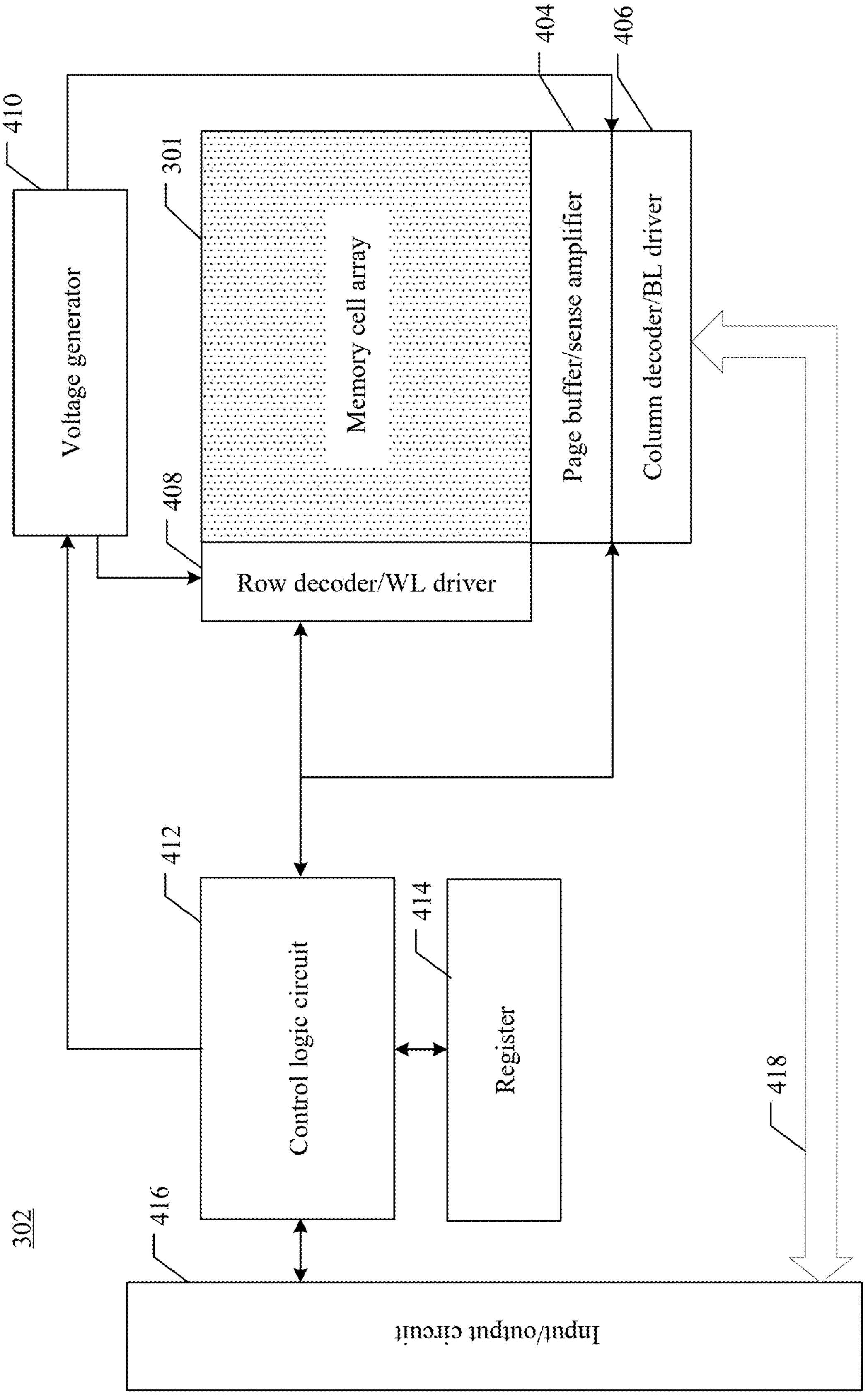
FIG. 4 is a schematic diagram of a peripheral circuit provided by examples of the present disclosure.

FIG. 4 is a schematic diagram of a peripheral circuit provided by examples of the present disclosure. As shown in FIG. 4, the peripheral circuit 302 may include a page buffer circuit/sense amplifier 404, a column decoder/BL driver 406, a row decoder/WL driver 408, a voltage generator 410, a control logic circuit 412, a register 414, an input/output (I/O) circuit 416, and a data bus 418. It should be appreciated that in some examples, additional peripheral circuits not shown in FIG. 4 may be further included.

In some examples, the page buffer circuit/sense amplifier 404 may be configured to read data from the memory cell array 301 and program (write) data to the memory cell array 301 according to a control signal from the control logic circuit 412. For example, the page buffer circuit/sense amplifier 404 may store one page of program data (write data) to be programmed into the memory cell array 301. For another example, the page buffer circuit/sense amplifier 404 may also sense a low power signal from the bit line 316 that represents a data bit stored in the memory cell 306, and amplifies a small voltage swing to a recognizable logic level in the read operation. The column decoder/BL driver 406 may be configured to be controlled by the control logic circuit 412, and select one or more memory strings 308 by applying a bit line voltage generated from the voltage generator 410.

The row decoder/WL driver 408 may be configured to be controlled by the control logic circuit 412, select/deselect the block 304 of the memory cell array 301, and select/deselect the word line 318 of the block 304. The row decoder/WL driver 408 may be further configured to drive the word line 318 using a word line voltage generated from the voltage generator 410. In some examples, the row decoder/WL driver 408 may also select/deselect and drive the SSG line 315 and the DSG line 313. The voltage generator 410 may be configured to be controlled by the control logic circuit 412 and generate a word line voltage (such as a read voltage, a program voltage, a pass voltage, a local voltage, or a verify voltage), a bit line voltage, and a source line voltage to be supplied to the memory cell array 301.

The control logic circuit 412 may be coupled to each portion of the peripheral circuit 302 and configured to control operations of each portion. The register 414 may be coupled to the control logic circuit 412, and may include a state register, a command register, and an address register, so as to store state information, a command operation code (OP code), and a command address for controlling the operations of each peripheral circuit. The input/output circuit 416 may be coupled to the control logic circuit 412, and acts as a control buffer to buffer a control command received from a host (not shown in FIG. 4) and relay it to the control logic circuit 412, and to buffer the state information received from the control logic circuit 412 and relay it to the host. The input/output circuit 416 may also be coupled to the column decoder/bit line driver 406 via the data bus 418 and act as a data I/O interface and a data buffer to buffer and relay the data to and from the memory cell array 301.

Figure 5:
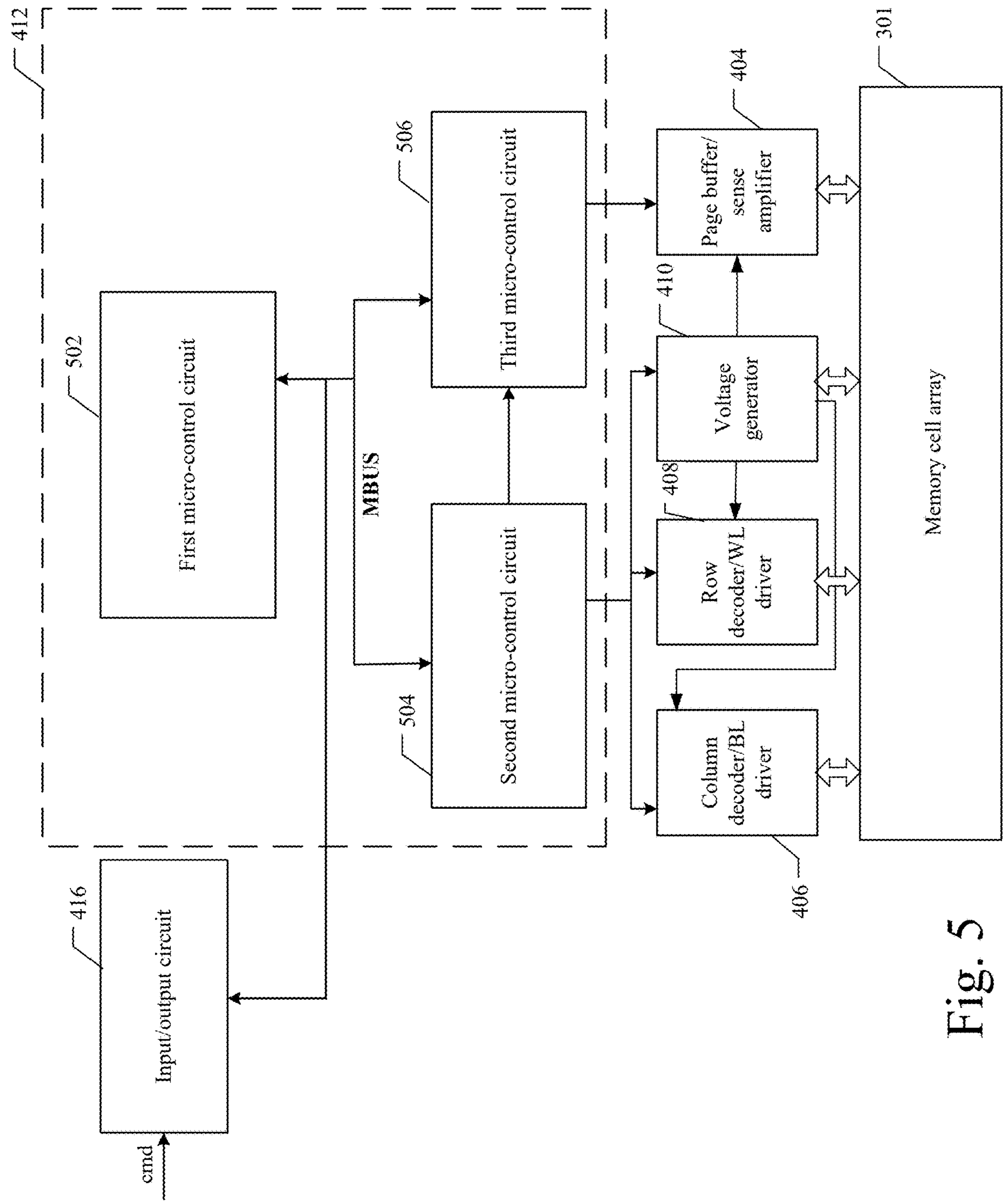
FIG. 5 shows a schematic structural diagram of an example control logic.

FIG. 5 shows a schematic structural diagram of an example control logic. Taking as an example that an architecture shown in FIG. 5 is applied to FIG. 4, as shown in FIG. 5, the control logic circuit 412 of FIG. 4 may include a first micro-control circuit 502, a second micro-control circuit 504, and a third micro-control circuit 506, wherein the first micro-control circuit 502 may be a main micro-control circuit, and the second micro-control circuit 504 and the third micro-control circuit 506 may be secondary micro-control circuits. The first micro-control circuit 502 is separately coupled to the second micro-control circuit 504 and the third micro-control circuit 506 through a data bus (MBUS). The second micro-control circuit 504 may be coupled to the third micro-control circuit 506.

In some examples, the input/output circuit 416 may receive operating commands (cmd), such as read, program, erase and the like, from the host (not shown in FIG. 5), and convert them into triggering information corresponding to the operating command, and then send the triggering information to the first micro-control circuit 502 in the control logic circuit 412 via the data bus (MBUS). The first micro-control circuit 502 executes an operating instruction corresponding to the operating command according to the triggering information to perform a main process of the operating command.

As shown in FIG. 5, the second micro-control circuit 504 may be configured to execute a branch instruction that operates the memory cell array 301 by controlling the column decoder/BL driver 406, the row decoder/WL driver 408, and the voltage generator 410. The third micro-control circuit 506 may be configured to execute a branch instruction that operates the memory cell array 301 by controlling the page buffer circuit/sense amplifier 404. The first micro-control circuit 502 may write an initial address corresponding to an operating command. The second micro-control circuit 504 and the third micro-control circuit 506 may acquire an instruction set corresponding to the operating command from the register 414 according to the initial address to execute corresponding instructions after being enabled.

In some examples, the first micro-control circuit 502 can enable the second micro-control circuit 504 and/or the third micro-control circuit 506 in the process of executing instructions such that the second micro-control circuit 504 and/or the third micro-control circuit 506 execute the branch instructions corresponding to the operating command. The first micro-control circuit 502 can further receive a feedback signal of the second micro-control circuit 504 and/or the third micro-control circuit 506. The feedback signal may be configured to indicate the completion of the execution of the branch instructions.

In some examples, the second micro-control circuit 504 may also enable the third micro-control circuit 506 at a suitable time in the process of executing the branch instruction, for example, after the completion of executing the instruction of applying voltages to the WL and the BL through the column decoder/BL driver 406, the row decoder/WL driver 408, and the voltage generator 410, when an instruction related to transmitting data through the page buffer circuit/sense amplifier 404 needs to be executed, the third micro-control circuit 506 is enabled to execute the corresponding data transmission branch instruction. The second micro-control circuit 504 can further receive a feedback signal of the third micro-control circuit 506. The feedback signal may be configured to indicate the completion of the execution of the branch instruction.

The memory provided according to the examples of the present disclosure achieves sending enable signal from the second micro-control circuit to the third micro-control circuit to execute the corresponding branch instruction. Then enabling the second micro-control circuit, the first micro-control circuit does not need to enable the third micro-control circuit after confirming that the second micro-control circuit completes the execution of the branch instruction thereof. That is, the time of the first micro-control circuit can be saved for preparatory work for subsequent operations, thereby reducing the total time of operations such as memory programming, reading, or verification, etc.

FIGS. 6 to 16 show some example operation processes applied to a memory based on the control logic circuit of FIG. 5.

Figure 6:
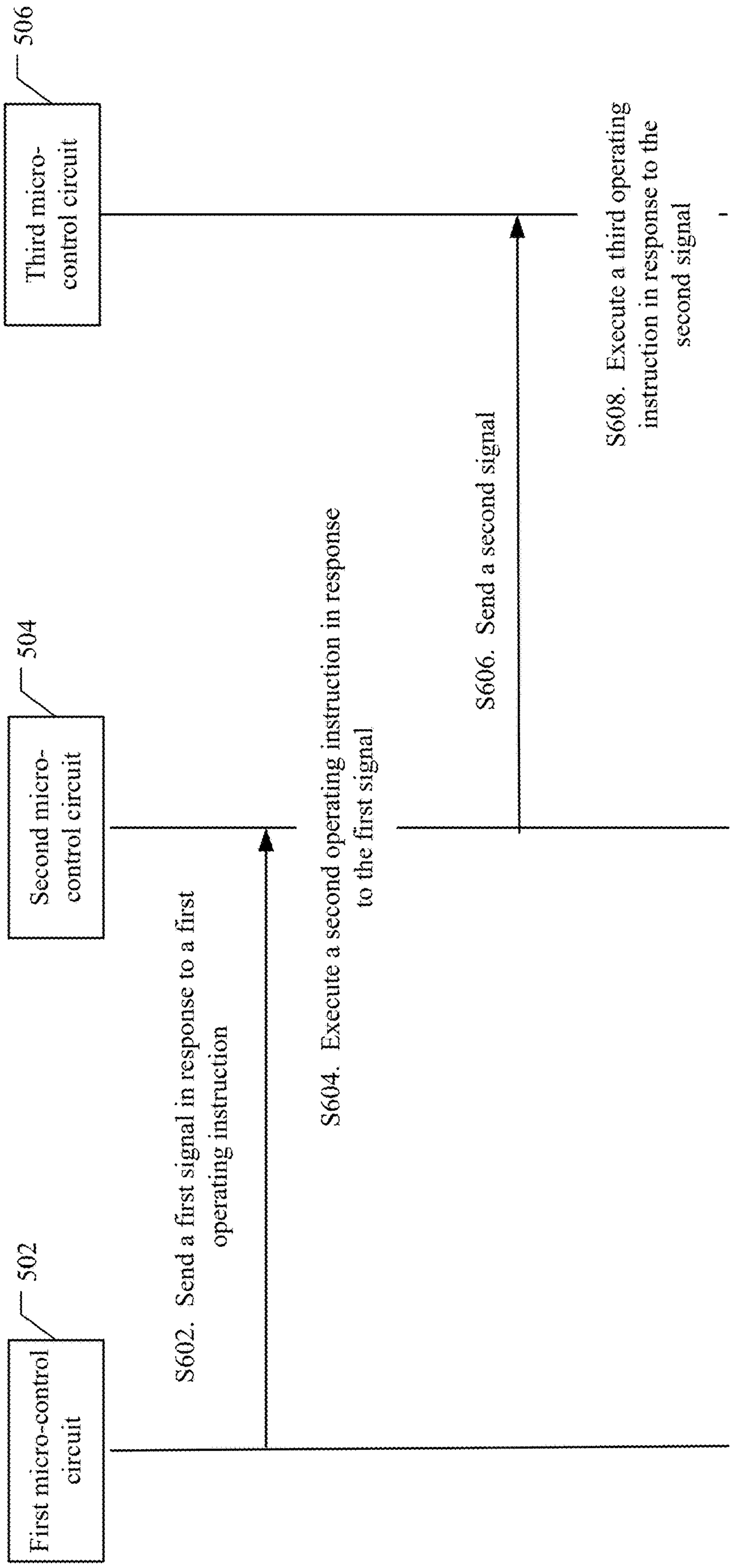
FIG. 6 is a flow diagram of a method of operating a memory shown according to an example.

FIG. 6 is a flow diagram of a method of operating a memory according to an example. Referring to FIG. 6, the method provided by the examples of the present disclosure may include the following operations S602 to S608.

In operation S602, in response to executing a first operating instruction, the first micro-control circuit 502 sends a first signal to the second micro-control circuit 504.

In some examples, the first operating instruction may be an operating instruction in a main process of an operating command. For example, if the operating command is an erase command, the operating instruction in the main process of the operating command may include applying an erase pulse instruction, an erase verify instruction, and the like.

In some examples, the first operating instruction may include one or more operating instructions.

In some examples, the first signal may be a signal of enabling the second micro-control circuit 504.

In operation S604, in response to the first signal, the second micro-control circuit 504 executes a second operating instruction.

In some examples, the second operating instruction may be a branch operating command corresponding to the operating command and to be executed by the second micro-control circuit 504. Still taking as an example that the operating command is an erase command, for example, if the first operating instruction is applying the erase pulse instruction, the second operating instruction may be an instruction of applying an erase voltage to the memory cell array 301 by controlling the column decoder/BL driver 406, the row decoder/WL driver 408, and the voltage generator 410. For another example, if the first operating instruction is an erase verify instruction, the second operating instruction may be an instruction of applying an erase verify voltage to the memory cell array 301 by controlling the column decoder/BL driver 406, the row decoder/WL driver 408, and the voltage generator 410.

In operation S606, the second micro-control circuit 504 sends a second signal to the third micro-control circuit 506.

In some examples, the second signal may be a signal of enabling the third micro-control circuit 506. In the process of executing the branch operating instruction, the second micro-control circuit 504 may send the second signal to the third micro-control circuit 506 if it needs to execute the branch instruction of operating the memory cell array 301 by controlling the page buffer circuit/sense amplifier 404.

In operation S608, in response to the second signal, the third micro-control circuit 506 executes a third operating instruction.

In some examples, the third operating instruction may be a branch instruction of operating the memory cell array 301 by controlling the page buffer circuit/sense amplifier 404. For example, if the first operating instruction is an erase verify instruction, the second operating instruction may be the operating instruction of applying the erase verify voltage to the memory cell array 301 by controlling the column decoder/BL driver 406, the row decoder/WL driver 408, and the voltage generator 410, and the third operating instruction may be the operating instruction of reading an erasing verification result by controlling the page buffer circuit/sense amplifier 404.

According to the method of operating the memory provided by the examples of the present disclosure, through sending an enable signal by the second micro-control circuit to the third micro-control circuit to execute the corresponding branch instruction, then after enabling the second micro-control circuit, the first micro-control circuit does not need to enable the third micro-control circuit after confirming that the second micro-control circuit completes the execution of the branch instruction thereof. That is, the time of the first micro-control circuit can be saved for preparatory work for subsequent operations, thereby reducing the total time of operations such as memory programming, reading, or verification, etc.

Figure 7:
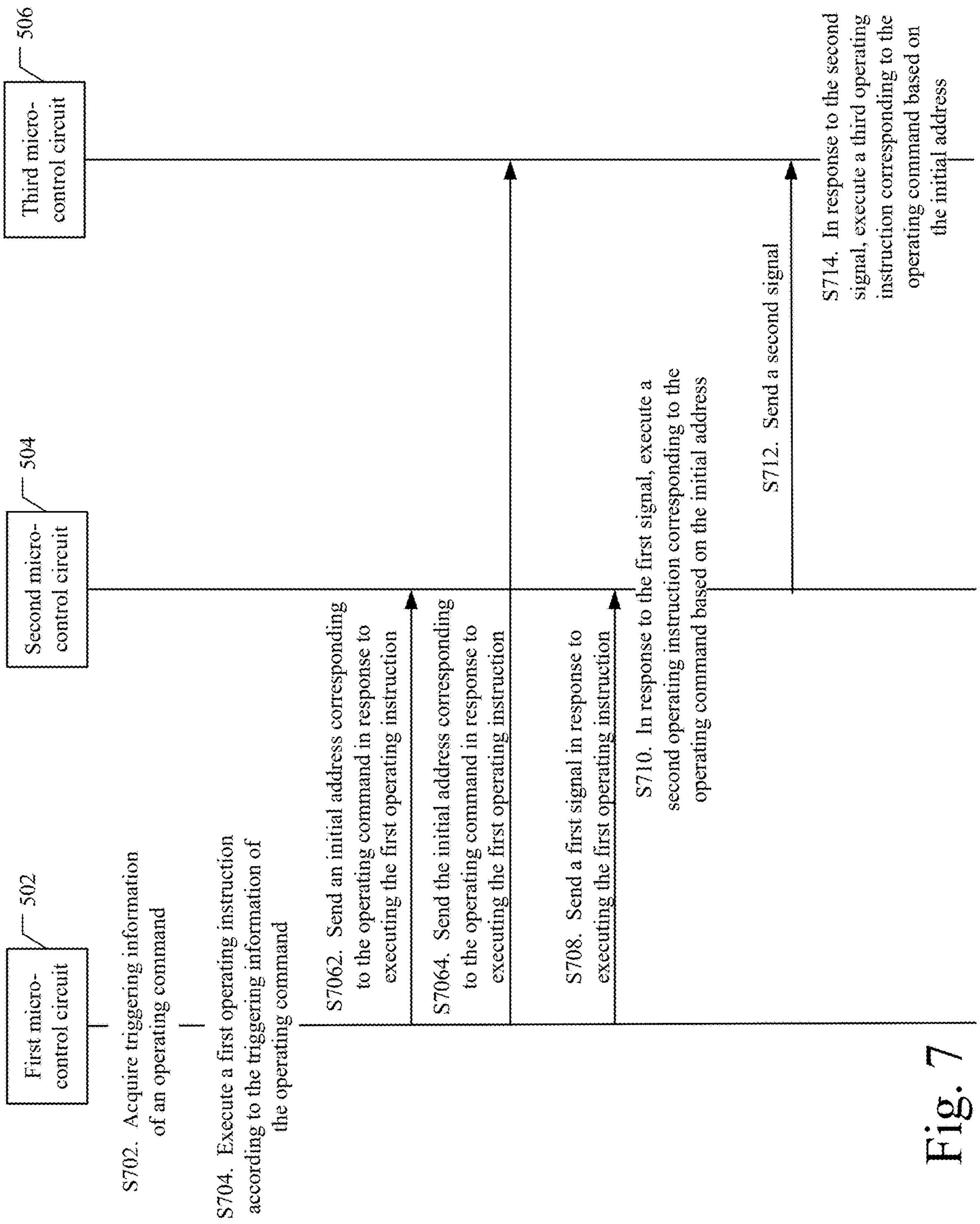
FIG. 7 is a flow diagram of another method of operating a memory shown according to an example.

FIG. 7 is a flow diagram of another method of operating a memory according to an example. FIG. 7 is associated with FIG. 6 in that FIG. 7 shows an example implementation of acquiring operating instructions corresponding to operating commands by the second micro-control circuit and the third micro-control circuit in FIG. 6.

Referring to FIG. 7, the method provided by the examples of the present disclosure may include the following operations S702 to S714.

In operation S702, the first micro-control circuit 502 acquires triggering information for an operating command.

In some examples, referring to FIG. 5, the input/output circuit 416 may receive operating commands (cmd), such as read, program, erase and the like, from the host, and convert them into triggering information corresponding to the operating commands, and then send the triggering information to the first micro-control circuit 502.

In operation S704, the first micro-control circuit 502 executes the first operating instruction according to the triggering information for the operating command.

In some examples, the first micro-control circuit 502 may be triggered by the triggering information for the operating command to start performing the main process of the operating command. For a particular implementation of the first operating instruction, a reference may be made to operation S602.

In operation S7062, in response to executing the first operating instruction, the first micro-control circuit 502 sends an initial address corresponding to the operating command to the second micro-control circuit 504.

In operation S7064, in response to executing the first operating instruction, the first micro-control circuit 502 sends the initial address corresponding to the operating command to the third micro-control circuit 506.

In some examples, in the process of executing the first operating instruction, the first micro-control circuit 502 can send the initial address corresponding to the operating command to the second micro-control circuit 504 and the third micro-control circuit 506. The initial address may be, for example, an address in a command register, that stores an instruction set corresponding to the operating command. The instruction set may include a second operating instruction, a third operating instruction, and the like.

In operation S708, in response to executing the first operating instruction, the first micro-control circuit 502 sends a first signal to the second micro-control circuit 504.

For an implementation of operation S708 in some examples, a reference may be made to operation S602.

In operation S710, in response to the first signal, the second micro-control circuit 504 executes a second operating instruction corresponding to the operating command based on the initial address.

In some examples, after being enabled by the first signal, the second micro-control circuit 504, may acquire the instruction set of the operating command according to the initial address and execute the second operating instruction in the instruction set. For an implementation of the second operating instruction in some examples, a reference may be made to operation S604.

In operation S712, the second micro-control circuit 504 sends a second signal to the third micro-control circuit 506.

For an implementation of operation S712 in some examples, a reference may be made to operation S606.

In operation S714, in response to the second signal, the third micro-control circuit 506 executes a third operating instruction corresponding to the operating command based on the initial address.

In some examples, after being enabled by the second signal, the third micro-control circuit 506 may acquire the instruction set of the operating command according to the initial address and execute the third operating instruction in the instruction set. For an implementation of the third operating instruction in some examples, a reference may be made to operation S608.

According to the method of operating the memory provided by the examples of the present disclosure, the first micro-control circuit executes the first operating instruction corresponding to the operating command according to the obtained triggering information, sends the initial address corresponding to the operating command to the second micro-control circuit and the third micro-control circuit, and sends the first signal to the second micro-control circuit. The second micro-control circuit executes the second operating instruction corresponding to the operating command in response to the first signal. The second signal is sent by the second micro-control circuit to the third micro-control circuit. The third micro-control circuit executes the third operating instruction corresponding to the operating command in response to the second signal. The first micro-control circuit may be used as a main micro-control circuit to provide the instruction set corresponding to the operating command to the second micro-control circuit and the third micro-control circuit such that the second micro-control circuit and the third micro-control circuit execute the respective operating instructions that they in charge of in the instruction set.

Figure 8:
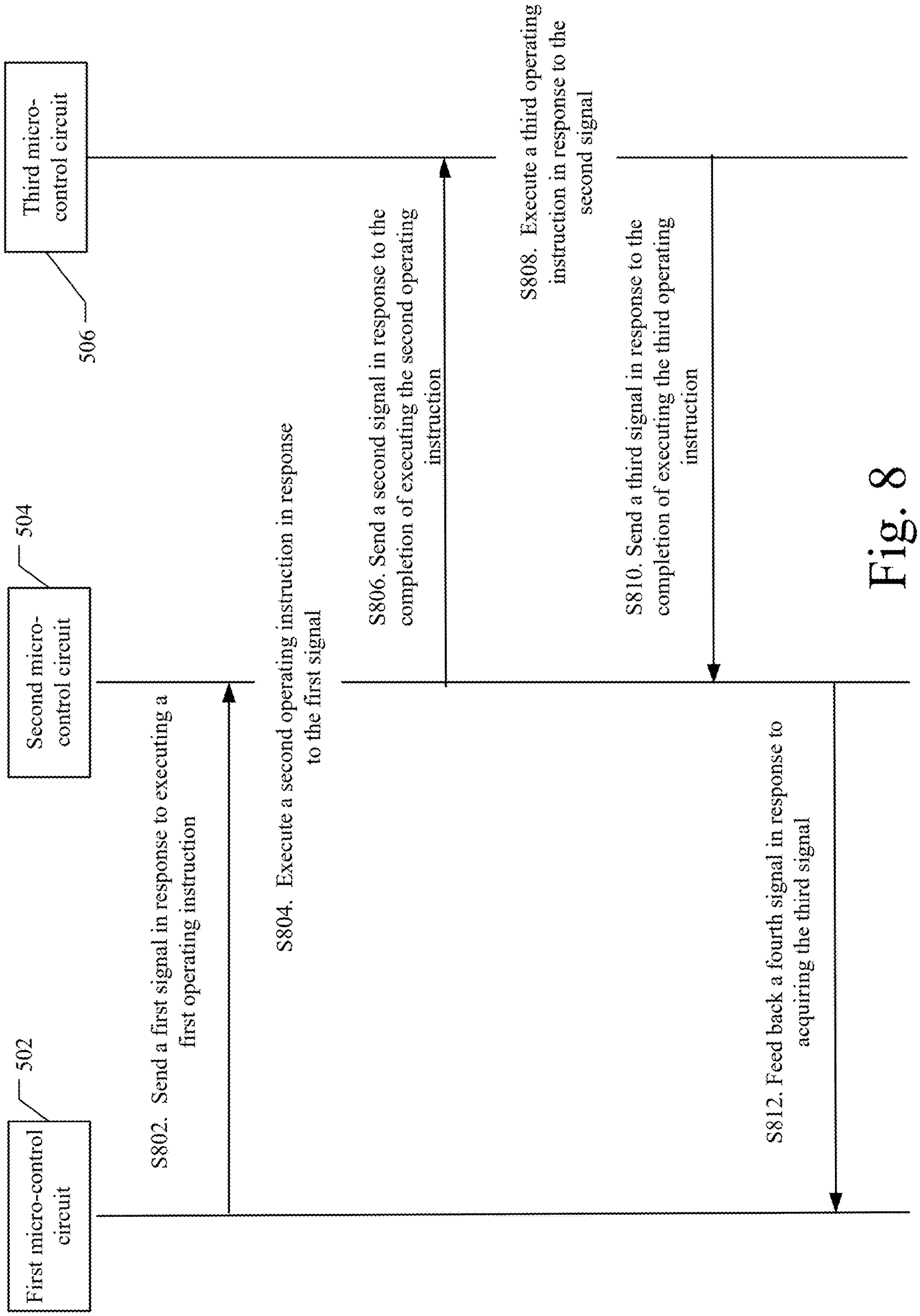
FIG. 8 is a flow diagram of further another method of operating a memory shown according to an example.

FIG. 8 is a flow diagram of another method of operating a memory shown according to an example. FIG. 8 shows an example implementation in which the first micro-control circuit knows that the second micro-control circuit completes the execution of the branch instruction and the second micro-control circuit knows that the third micro-control circuit completes the execution of the branch instruction as shown in FIG. 6.

Referring to FIG. 8, the method provided by the examples of the present disclosure may include the following operations S802 to S812.

In operation S802, in response to executing a first operating instruction, the first micro-control circuit 502 sends a first signal to the second micro-control circuit 504.

In operation S804, in response to the first signal, the second micro-control circuit 504 executes a second operating instruction.

For an implementation of operations S802 and S804 in some examples, a reference may be made to operations S602 and S604.

In operation S806, in response to the completion of executing the second operating instruction, the second micro-control circuit 504 sends a second signal to the third micro-control circuit 506.

In some examples, the second micro-control circuit 504 sends the second signal to the third micro-control circuit 506 after the completion of executing the second operating instruction. For example, if the second operating instruction is an instruction of applying an erase verify voltage to the memory cell array 301 by controlling the column decoder/BL driver 406, the row decoder/WL driver 408, and the voltage generator 410, since an operating instruction of reading an erasing verification result by controlling the page buffer circuit/sense amplifier 404 needs to be executed afterwards, the second signal may be sent to the third micro-control circuit 506 such that the third micro-control circuit 506 is enabled to execute the corresponding operating instruction.

In operation S808, in response to the second signal, the third micro-control circuit 506 executes a third operating instruction.

For an implementation of operation S808 in some examples, a reference may be made to operation S608.

In operation S810, in response to the completion of executing the third operating instruction, the third micro-control circuit 506 sends a third signal to the second micro-control circuit 504.

In some examples, after the completion of executing the third operating instruction, the third micro-control circuit 506 can send the third signal for feeding back the completion of instruction execution to the second micro-control circuit 504 such that the second micro-control circuit 504 feeds back to the first micro-control circuit 502 that the execution of all the branch instructions corresponding to the operating instruction has been completed (operation S812), or such that the second micro-control circuit 504 executes next branch operating instruction corresponding to the operating instruction (operation S912) or next second operating instruction.

In operation S812, in response to acquiring the third signal, the second micro-control circuit 504 feeds back a fourth signal to the first micro-control circuit 502.

In some examples, after acquiring the third signal for feeding back the completion of executing the third operating instruction by the third micro-control circuit 506, the second micro-control circuit 504 may feed back the fourth signal to the first micro-control circuit 502 to indicate that the execution of all the branch instructions corresponding to the operating instruction has been completed, so that the first micro-control circuit 502 can execute next first operating instruction corresponding to the operating instruction or progresses to the main process of next operating command.

According to the method of operating the memory provided by the examples of the present disclosure, after the third micro-control circuit completes the executing of the third operation instruction, the third micro-control circuit sends the third signal for feeding back the completion of instruction execution to the second micro-control circuit. The second micro-control circuit feeds back the fourth signal to the first micro-control circuit in response to the third signal to indicate that the execution of all the branch instructions corresponding to the operating instruction has been completed. After enabling the second micro-control circuit, the first micro-control circuit does not need to inquire whether the third micro-control circuit completes the execution of the branch instruction. That is, the time of the first micro-control circuit can be saved for preparatory work for subsequent operations, thereby reducing the total time of operations such as memory programming, reading, or verification, etc.

Figure 9:
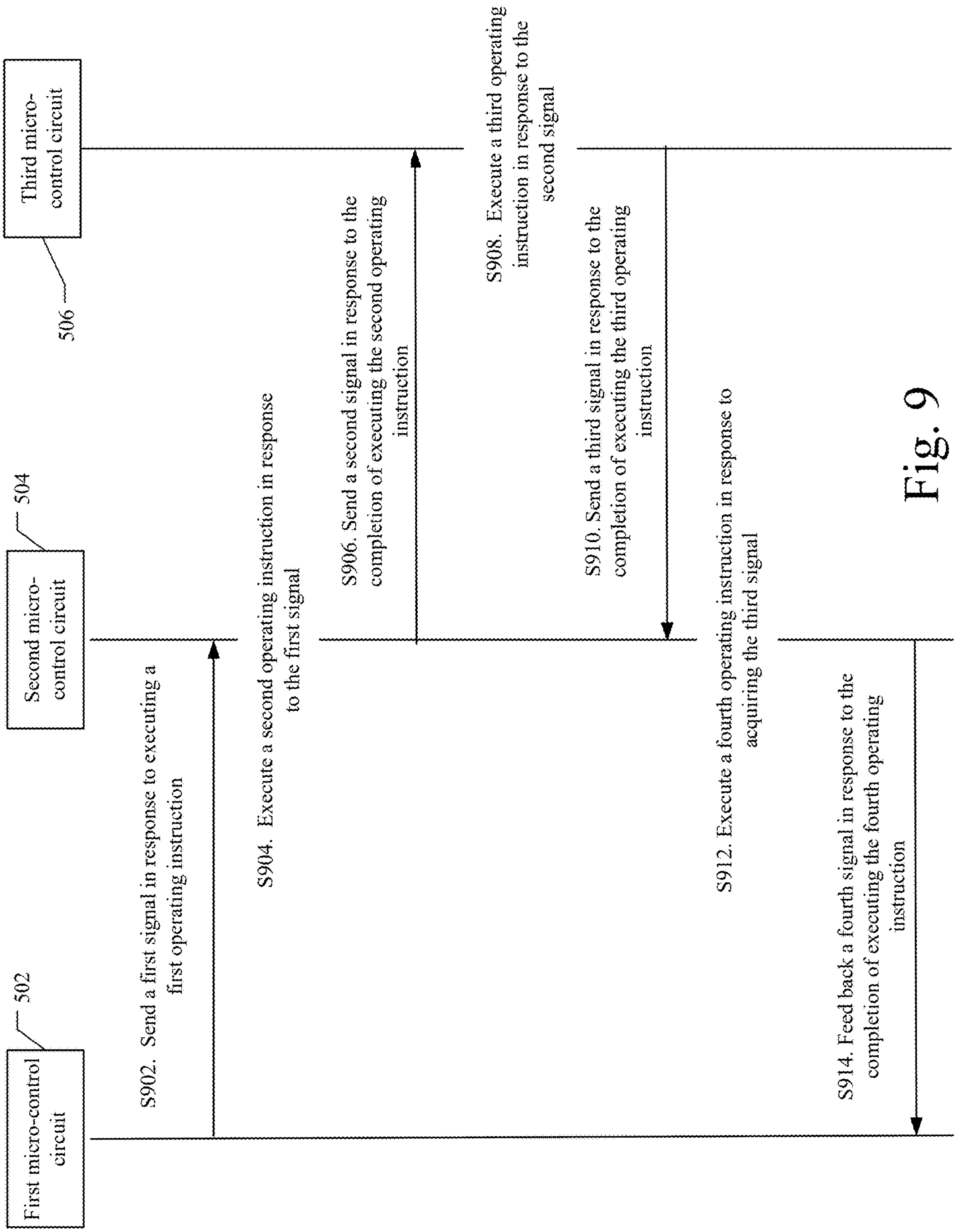
FIG. 9 is a flow diagram of yet another method of operating a memory shown according to an example.

FIG. 9 is a flow diagram of yet another method of operating a memory shown according to an example. FIG. 9 also shows an example implementation in which the first micro-control circuit knows that the second micro-control circuit completes the execution of the branch instruction and the second micro-control circuit knows that the third micro-control circuit completes the execution of the branch instruction as shown in FIG. 6. FIG. 9 differs from FIG. 8 in that, the second micro-control circuit in FIG. 9 knows that the third micro-control circuit will execute next branch instruction afterwards and will feeds back to the first micro-control circuit after the execution of the next branch instruction is completed.

Referring to FIG. 9, the method provided by the examples of the present disclosure may include the following operations.

In operation S902, in response to executing a first operating instruction, the first micro-control circuit 502 sends a first signal to the second micro-control circuit 504.

In operation S904, in response to the first signal, the second micro-control circuit 504 executes a second operating instruction.

In operation S906, in response to the completion of executing the second operating instruction, the second micro-control circuit 504 sends a second signal to the third micro-control circuit 506.

In operation S908, in response to the second signal, the third micro-control circuit 506 executes a third operating instruction.

In operation S910, in response to the completion of executing the third operating instruction, the third micro-control circuit 506 sends a third signal to the second micro-control circuit 504.

For an implementation of operations S902 to S910 in some examples, a reference may be made to operations S802 to S810.

In operation S912, in response to acquiring the third signal, the second micro-control circuit 504 executes a fourth operating instruction.

In operation S914, in response to the completion of executing the fourth operating instruction, the second micro-control circuit 504 feeds back a fourth signal to the first micro-control circuit 502.

In some examples, the fourth operating instruction may be a next branch instruction corresponding to the operating command and different from the second operating instruction. For example, data transmission may not be involved in the process of executing the operating instruction, and after its execution has been completed, the second micro-control circuit 504 may feed back the fourth signal to indicate that the execution of all the branch instructions corresponding to the operating instruction has been completed.

According to the method of operating the memory provided by the examples of the present disclosure, after the third micro-control circuit completes the executing of the third operation instruction, the third micro-control circuit sends the third signal for feeding back the completion of instruction execution to the second micro-control circuit. The second micro-control circuit executes the fourth operating instruction in response to the third signal, and after the completion of executing the fourth operating instruction, feeds back the fourth signal to the first micro-control circuit to indicate that the execution of all the branch instructions corresponding to the operating instruction has been completed. After enabling the second micro-control circuit, the first micro-control circuit does not need to inquire whether the third micro-control circuit completes the execution of the branch instruction and also does not need to instruct the second micro-control circuit to execute next branch instruction after confirming that the third micro-control circuit completes the execution of the branch instruction. That is, the time of the first micro-control circuit can be saved for preparatory work for subsequent operations, thereby reducing the total time of operations such as memory programming, reading, or verification, etc.

Figure 10:
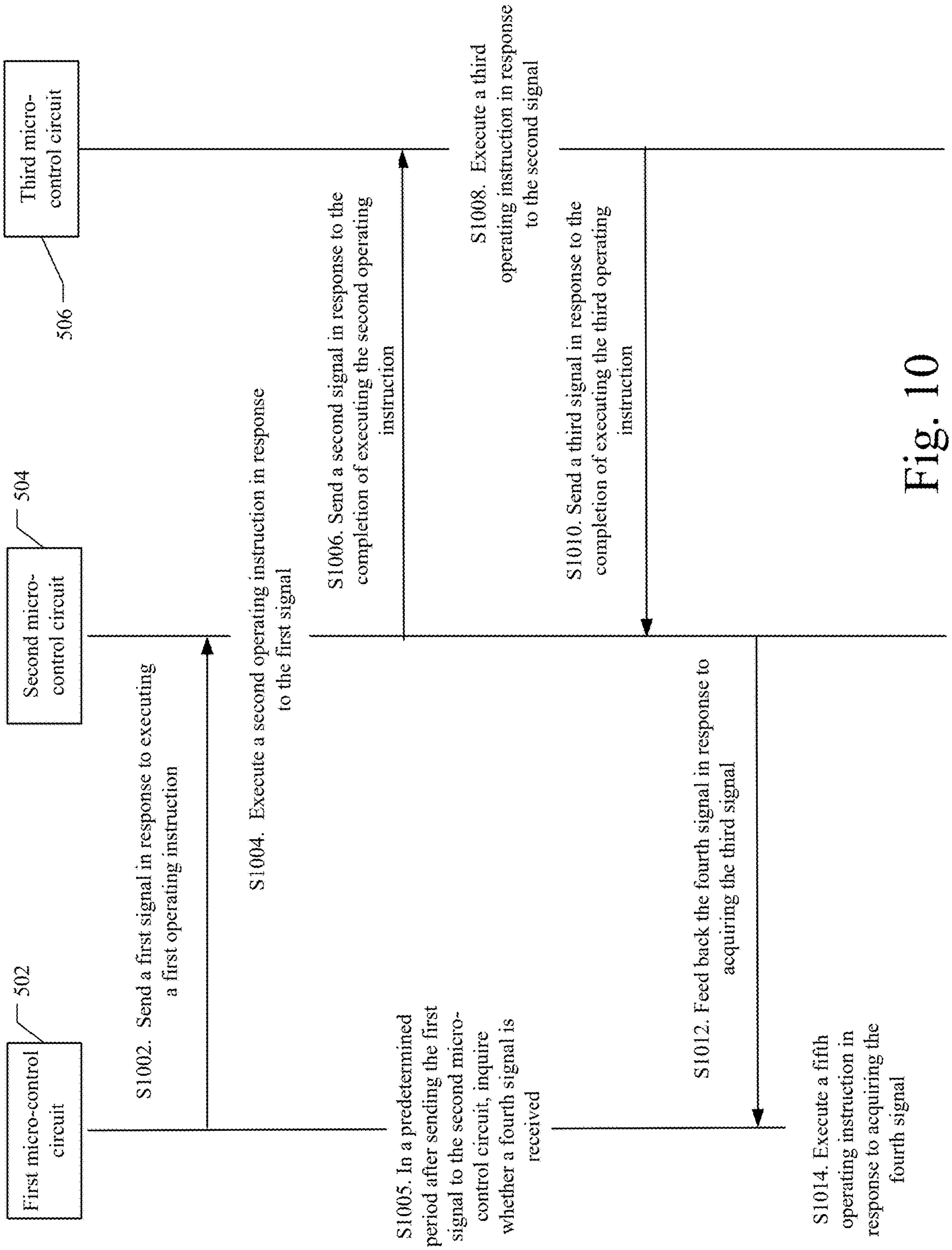
FIG. 10 is a flow diagram of still another method of operating a memory shown according to an example.

FIG. 10 is a flow diagram of still another method of operating a memory shown according to an example. On the basis of FIG. 8, FIG. 10 shows an example implementation in which the first micro-control circuit knows that the second micro-control circuit and the third micro-control circuit complete the execution of branch instructions, and shows an example implementation after the first micro-control circuit confirms that the second micro-control circuit and the third micro-control circuit complete the execution of the branch instructions.

Referring to FIG. 10, the method provided by the examples of the present disclosure may include the following operations S1002 to S1014.

In operation S1002, in response to executing a first operating instruction, the first micro-control circuit 502 sends a first signal to the second micro-control circuit 504.

In operation S1004, in response to the first signal, the second micro-control circuit 504 executes a second operating instruction.

For an implementation of operations S1002 to S1004 in some examples, a reference may be made to operations S802 to S804.

In operation S1005, in a predetermined period after sending the first signal to the second micro-control circuit 504, the first micro-control circuit 502 inquires whether a fourth signal is received.

In some examples, the predetermined period may be a preset number of instruction execution periods. One instruction execution period may be, for example, 20 ns. The preset number may be, for example, 2, 3, 4, 5, and the like. For example, the first micro-control circuit 502 may separately inquire whether the fourth signal is received in 2 instruction execution periods, 3 instruction execution periods, 4 instruction execution periods, . . . , after sending the first signal to the second micro-control circuit 504, until it confirms that the fourth signal is received, and stop inquiring after the confirmation. For another example, the first micro-control circuit 502 may also separately inquire whether the fourth signal is received in 2 instruction execution periods, 4 instruction execution periods, 6 instruction execution periods, . . . , after sending the first signal to the second micro-control circuit 504, until it confirms that the fourth signal is received, and stop inquiring after the confirmation.

In operation S1006, in response to the completion of executing the second operating instruction, the second micro-control circuit 504 sends a second signal to the third micro-control circuit 506.

In operation S1008, in response to the second signal, the third micro-control circuit 506 executes a third operating instruction.

In operation S1010, in response to the completion of executing the third operating instruction, the third micro-control circuit 506 sends a third signal to the second micro-control circuit 504.

In operation S1012, in response to acquiring the third signal, the second micro-control circuit 504 feeds back a fourth signal to the first micro-control circuit 502.

For an implementation of operations S1006 to S1012 in some examples, a reference may be made to operations S806 to S812.

In operation S1014, in response to acquiring the fourth signal, the first micro-control circuit 502 executes a fifth operating instruction.

In some examples, after confirming the reception of the fourth signal fed back by the second micro-control circuit 504 that indicates the execution of all the branch instructions corresponding to the operating instruction has been completed, the first micro-control circuit 502 can execute a next operating instruction corresponding to the operating instruction, for example, which may be the fifth operating instruction different from the first operating instruction in type. Taking as an example that the first operating instruction is an erase verify instruction, the fifth operating instruction may be an instruction of applying erase pulse for next erase operation.

According to the method of operating the memory provided by the examples of the present disclosure, through inquiring, by the first micro-control circuit, whether the fourth signal fed back by the second micro-control circuit for indicating the completion of the branch operations is received in a predetermined period after sending an enable signal to the second micro-control circuit, the first micro-control circuit can achieve executing next main process instruction after confirming the completion of the branch instructions.

Figure 11:
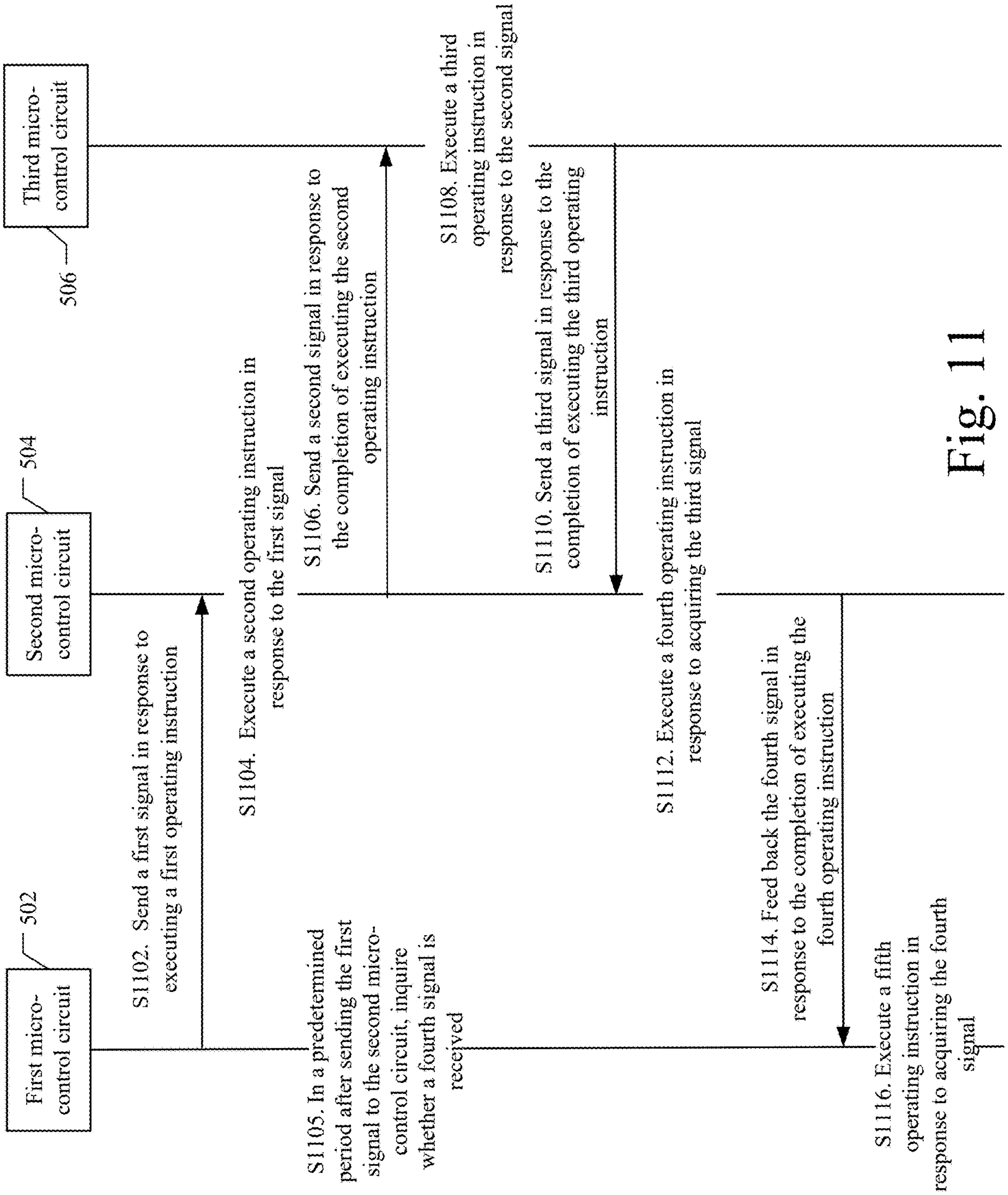
FIG. 11 is a flow diagram of still another method of operating a memory shown according to an example.

FIG. 11 is a flow diagram of still another method of operating a memory shown according to an example. On the basis of FIG. 9, FIG. 11 shows an example implementation in which the first micro-control circuit knows that the second micro-control circuit and the third micro-control circuit complete the execution of branch instructions, and shows an example implementation after the first micro-control circuit confirms that the second micro-control circuit and the third micro-control circuit complete the execution of the branch instructions.

Referring to FIG. 11, the method provided by the examples of the present disclosure may include the following operations S1102 to S1116.

In operation S1102, in response to executing a first operating instruction, the first micro-control circuit 502 sends a first signal to the second micro-control circuit 504.

In operation S1104, in response to the first signal, the second micro-control circuit 504 executes a second operating instruction.

For an implementation of operations S1102 to S1104 in some examples, a reference may be made to operations S902 to S904.

In operation S1105, in a predetermined period after sending the first signal to the second micro-control circuit 504, the first micro-control circuit 502 inquires whether a fourth signal is received.

For an implementation of operation S1105 in some examples, a reference may be made to operation S1005.

In operation S1106, in response to the completion of executing the second operating instruction, the second micro-control circuit 504 sends a second signal to the third micro-control circuit 506.

In operation S1108, in response to the second signal, the third micro-control circuit 506 executes a third operating instruction.

In operation S1110, in response to the completion of executing the third operating instruction, the third micro-control circuit 506 sends a third signal to the second micro-control circuit 504.

In operation S1112, in response to acquiring the third signal, the second micro-control circuit 504 executes a fourth operating instruction.

In operation S1114, in response to the completion of executing the fourth operating instruction, the second micro-control circuit 504 feeds back a fourth signal to the first micro-control circuit 502.

For an implementation of operations S1106 to S1114 in some examples, a reference may be made to operations S906 to S914.

In operation S1116, in response to acquiring the fourth signal, the first micro-control circuit 502 executes a fifth operating instruction.

For an implementation of operation S1106 in some examples, a reference may be made to operation S1014.

According to the method of operating the memory provided by the examples of the present disclosure, through inquiring, by the first micro-control circuit, whether the fourth signal fed back by the second micro-control circuit for indicating the completion of the branch operations is received in a predetermined period after sending an enable signal to the second micro-control circuit, the first micro-control circuit can achieve executing next main process instruction after confirming the completion of the branch instructions.

Figure 12:
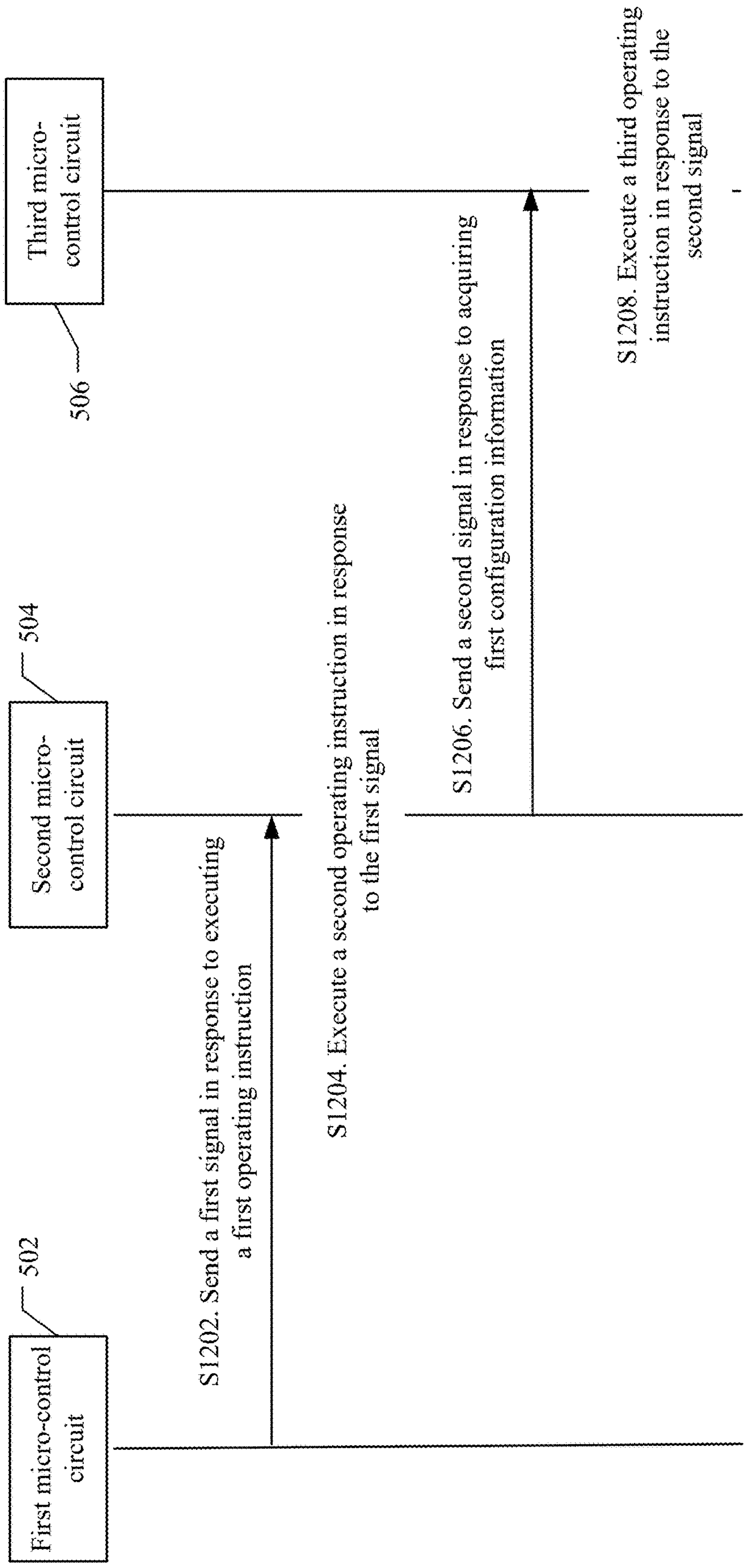
FIG. 12 is a flow diagram of still another method of operating a memory shown according to an example.

FIG. 12 is a flow diagram of still another method of operating a memory shown according to an example. On the basis of FIG. 6, FIG. 12 shows an example implementation in which the third micro-control circuit is enabled by the second micro-control circuit according to configuration information.

Referring to FIG. 12, the method provided by the examples of the present disclosure may include the following operations S1202 to S1208.

In operation S1202, in response to executing a first operating instruction, the first micro-control circuit 502 sends a first signal to the second micro-control circuit 504.

In operation S1204, in response to the first signal, the second micro-control circuit 504 executes a second operating instruction.

For an implementation of operations S1202 to S1204 in some examples, a reference may be made to operations S602 to S604.

In operation S1206, in response to acquiring first configuration information, the second micro-control circuit 504 sends a second signal to the third micro-control circuit 506.

In some examples, an entity for enabling the third micro-control circuit 506 may be configured. For example, it may be configured through the first configuration information, such that the second micro-control circuit 504 enables the third micro-control circuit 506, and the second micro-control circuit 504 sends the second signal in response to acquiring the first configuration information.

In operation S1208, in response to the second signal, the third micro-control circuit 506 executes a third operating instruction.

For an implementation of operation S1208 in some examples, a reference may be made to operation S608.

According to the method provided by the examples of the present disclosure, it may be configured through the first configuration information such that the second micro-control circuit enables the third micro-control circuit. A manner of enabling the third micro-control circuit may be selected according to the actual situation. The flexibility of a memory control manner is improved.

Figure 13:
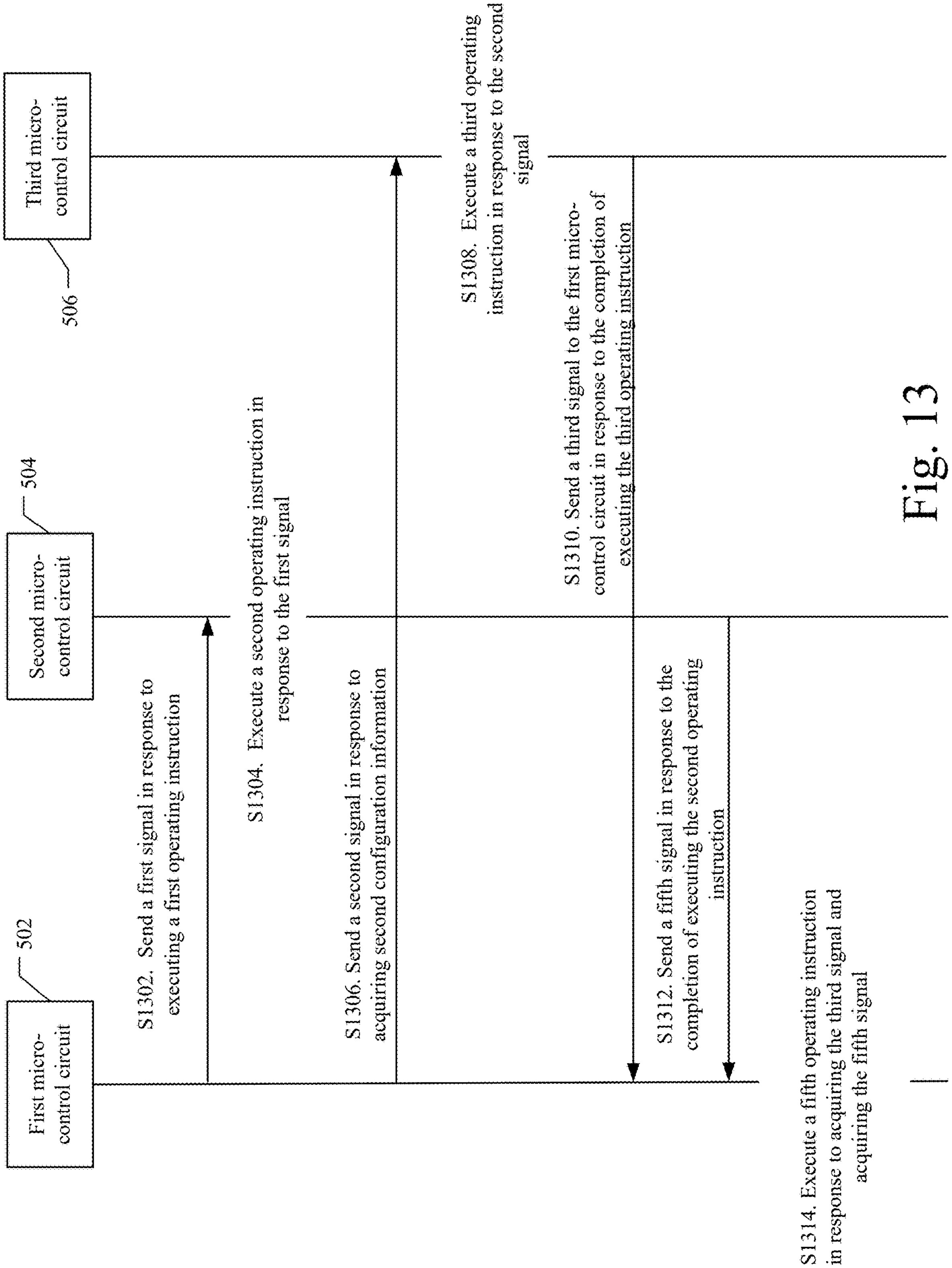
FIG. 13 is a flow diagram of still another method of operating a memory shown according to an example.

FIG. 13 is a flow diagram of still another method of operating a memory shown according to an example. The method shown in FIG. 13 may be a parallel implementation of the method shown in FIG. 12, in which the third micro-control circuit is enabled by the second micro-control circuit according to configuration information.

Referring to FIG. 13, the method provided by the examples of the present disclosure may include the following operations.

In operation S1302, in response to executing a first operating instruction, the first micro-control circuit 502 sends a first signal to the second micro-control circuit 504.

In operation S1304, in response to the first signal, the second micro-control circuit 504 executes a second operating instruction.

For an implementation of operations S1202 to S1204 in some examples, a reference may be made to operations S602 to S604.

In operation S1306, in response to acquiring second configuration information, the second micro-control circuit 502 sends a second signal to the third micro-control circuit 506.

In some examples, an entity for enabling the third micro-control circuit 506 may be configured. For example, it may be configured through the second configuration information, such that the first micro-control circuit 502 enables the third micro-control circuit 506, and the first micro-control circuit 502 sends the second signal in response to acquiring the second configuration information.

In operation S1308, in response to the second signal, the third micro-control circuit 506 executes a third operating instruction.

For an implementation of operation S1308 in some examples, a reference may be made to operation S608.

In operation S1310, in response to the completion of executing the third operating instruction, the third micro-control circuit 506 sends a third signal to the first micro-control circuit 502.

In some examples, under the configuration corresponding to the second configuration information, after completing the execution of the third operating instruction, the third micro-control circuit 506 may send the third signal for feeding back the completion of instruction execution to the first micro-control circuit 502.

In operation S1312, in response to the completion of executing the second operating instruction, the second micro-control circuit 504 sends a fifth signal to the first micro-control circuit 502.

In some examples, under the configuration corresponding to the second configuration information, after completing the execution of the second operating instruction, the second micro-control circuit 504 may send the fifth signal for feeding back the completion of instruction execution to the first micro-control circuit 502.

In operation S1314, in response to acquiring the third signal and acquiring the fifth signal, the first micro-control circuit 502 executes a fifth operating instruction.

In some examples, under the configuration corresponding to the second configuration information, after the first micro-control circuit 502 confirms the reception of the fifth signal fed back by the second micro-control circuit 504 that indicates the completion of the second operating instruction and confirms the reception of the third signal fed back by the third micro-control circuit 506 that indicates the completion of the third operating instruction, the first micro-control circuit 502 may execute next operating instruction corresponding to the operating instruction, which may be, for example, the fifth operating instruction different from the first operating instruction in type. Taking as an example that the first operating instruction is an erase verify instruction, the fifth operating instruction may be an instruction of applying erase pulse for next erase operation.

According to the method provided by the examples of the present disclosure, it may be configured through the second configuration information such that the first micro-control circuit enables the third micro-control circuit. A manner of enabling the third micro-control circuit may be selected according to the actual situation. The flexibility of a memory control manner is improved.

Figure 14:
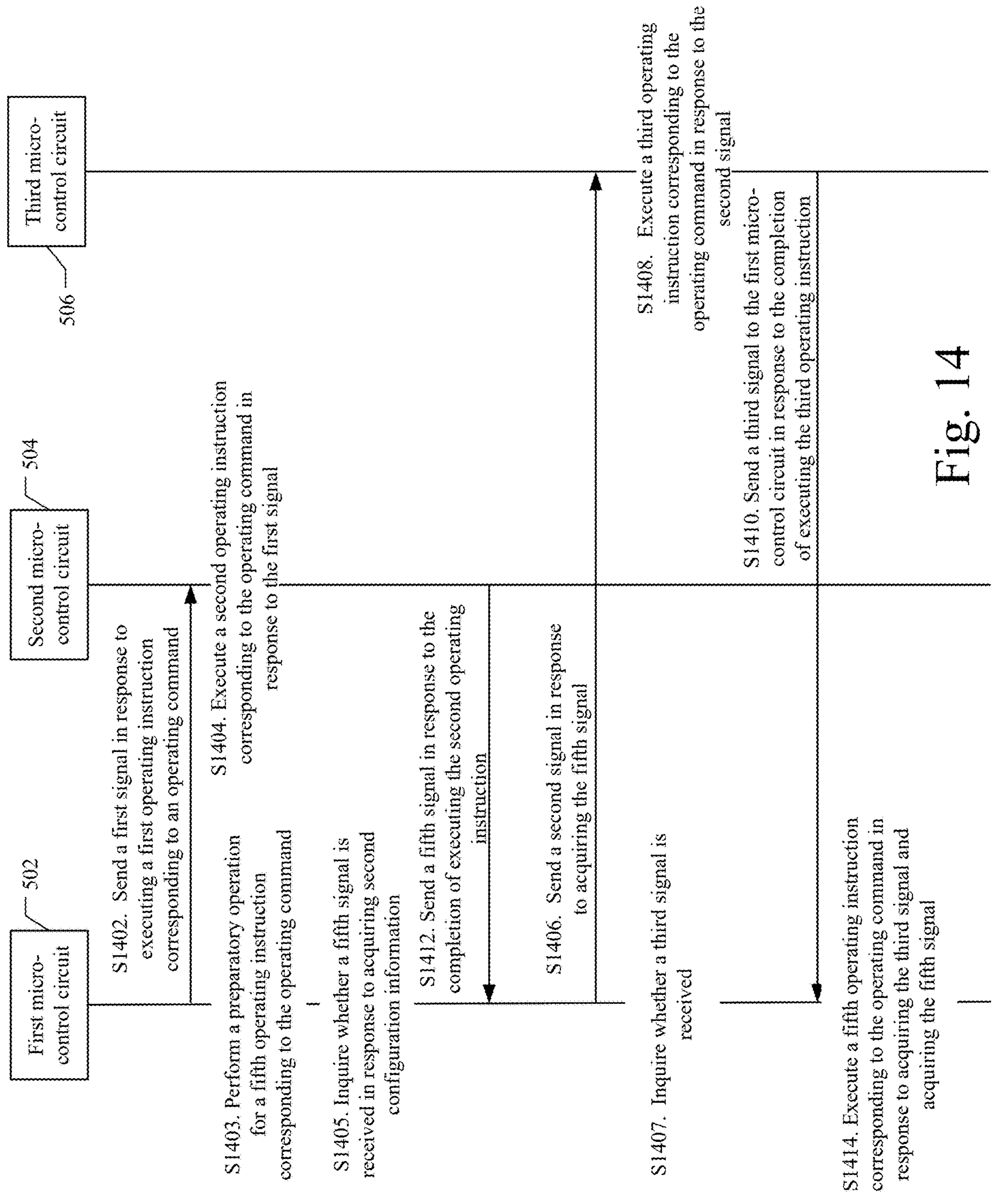
FIG. 14 is a flow diagram of still another method of operating a memory shown according to an example.

FIG. 14 is a flow diagram of still another method of operating a memory shown according to an example. On the basis of FIG. 13, FIG. 14 shows an example implementation in which the first micro-control circuit knows that the second micro-control circuit and the third micro-control circuit complete the execution of branch instructions, and shows an example implementation of an operation of the first micro-control circuit after sending the first signal.

Referring to FIG. 14, the method provided by the examples of the present disclosure may include the following operations.

In operation S1402, in response to executing a first operating instruction corresponding to an operating command, the first micro-control circuit 502 sends a first signal to the second micro-control circuit 504.

For an implementation of operation S1402 in some examples, a reference may be made to operation S1302.

In operation S1403, after sending the first signal to the second micro-control circuit 504, the first micro-control circuit 502 performs a preparatory operation for a fifth operating instruction corresponding to the operating command.

In some examples, after enabling the second micro-control circuit 504, the first micro-control circuit 502 may perform the preparatory operation for the fifth operating instruction corresponding to the operating command after the first operating command, e.g., which may be a preparatory operation such as writing data to a register and the like.

In operation S1404, in response to the first signal, the second micro-control circuit 504 executes a second operating instruction corresponding to the operating command.

For an implementation of operation S1404 in some examples, a reference may be made to operation S1304.

In operation S1405, in response to acquiring second configuration information, the first micro-control circuit 502 inquires whether a fifth signal is received.

In some examples, in response to the second configuration information for configuring that the first micro-control circuit 502 enables the third micro-control circuit 506, in a predetermined period after sending the first signal to the second micro-control circuit 504, the first micro-control circuit 502 may inquire whether the fifth signal fed back by the second micro-control circuit 504 is received. When the first micro-control circuit 502 inquires, the preparatory operation for operation S1403 may be paused.

In operation S1406, in response to acquiring the fifth signal, the first micro-control circuit 502 sends a second signal to the third micro-control circuit 506.

In some examples, after acquiring the fifth signal fed back by the second micro-control circuit 504 that indicates the completion of executing branch instructions, the first micro-control circuit 502 may send an enable signal to the third micro-control circuit 506.

In operation S1407, the first micro-control circuit 502 inquires whether a third signal is received.

In some examples, in a predetermined period after sending the second signal to the third micro-control circuit 506, the first micro-control circuit 502 may inquire whether the third signal fed back by the third micro-control circuit 506 is received. When the first micro-control circuit 502 inquires, the preparatory operation for operation S1403 may be paused.

In operation S1408, in response to the second signal, the third micro-control circuit 506 executes a third operating instruction corresponding to the operating command.

In operation S1410, in response to the completion of executing the third operating instruction, the third micro-control circuit 506 sends the third signal to the first micro-control circuit 502.

In operation S1412, in response to the completion of executing the second operating instruction, the second micro-control circuit 504 sends the fifth signal to the first micro-control circuit 502.

For an implementation of operations S1408 to S1412 in some examples, a reference may be made to operations $1308 to S1312.

In operation S1414, in response to acquiring the third signal, the first micro-control circuit 502 executes the fifth operating instruction.

In some examples, under the configuration corresponding to the second configuration information, after confirming the reception of the third signal fed back by the third micro-control circuit 506 that indicates the completion of the third operating instruction, the first micro-control circuit 502 may execute next operating instruction corresponding to the operating instruction.

According to the method of operating the memory provided by the examples of the present disclosure, the first micro-control circuit performs the respective main operation process according to the triggering information corresponding to the operating command, and enables the second micro-control circuit and the third micro-control circuit to perform respective branch operations in the execution process, while the first micro-control circuit continues with the preparatory work for next branch operation. In this way, a next branch operation may be started once the current branch operation is completed. The total time of operations such as a program operation, a read operation, an erase operation and the like can be saved.

According to the method of operating the memory provided by the examples of the present disclosure, the second micro-control circuit may perform the respective branch operation and then correspondingly feed back an indication signal to the first micro-control circuit. Once the first micro-control circuit detects the indication signal, it will enable the third micro-control circuit such that the third micro-control circuit starts to perform the respective branch operation. With increasing requirements on the functionality of the memory and increasingly high requirements on performance, the third micro-control circuit needs to control more and more tasks, and do more and more preparation for the next branch operation, while during waiting for the second micro-control circuit and the third micro-control circuit to perform respective branch operations, the first micro-control circuit needs to perform handshake inquiry with the second micro-control circuit in several periods such that it can enable the third micro-control circuit. If the first micro-control circuit enters a state of inquiring a handshake signal of the second micro-control circuit in advance, the preparatory work for next branch operation cannot be completed within the time of the branch operation. If there is a delay in entering the state of inquiring the handshake signal of the second micro-control circuit, the branch operation has been performed by the second micro-control circuit, but the third micro-control circuit is not enabled in time. The two cases of entering an inquiry state in advance or delaying to enter the inquiry state may affect the performance of the memory.

Figure 15:
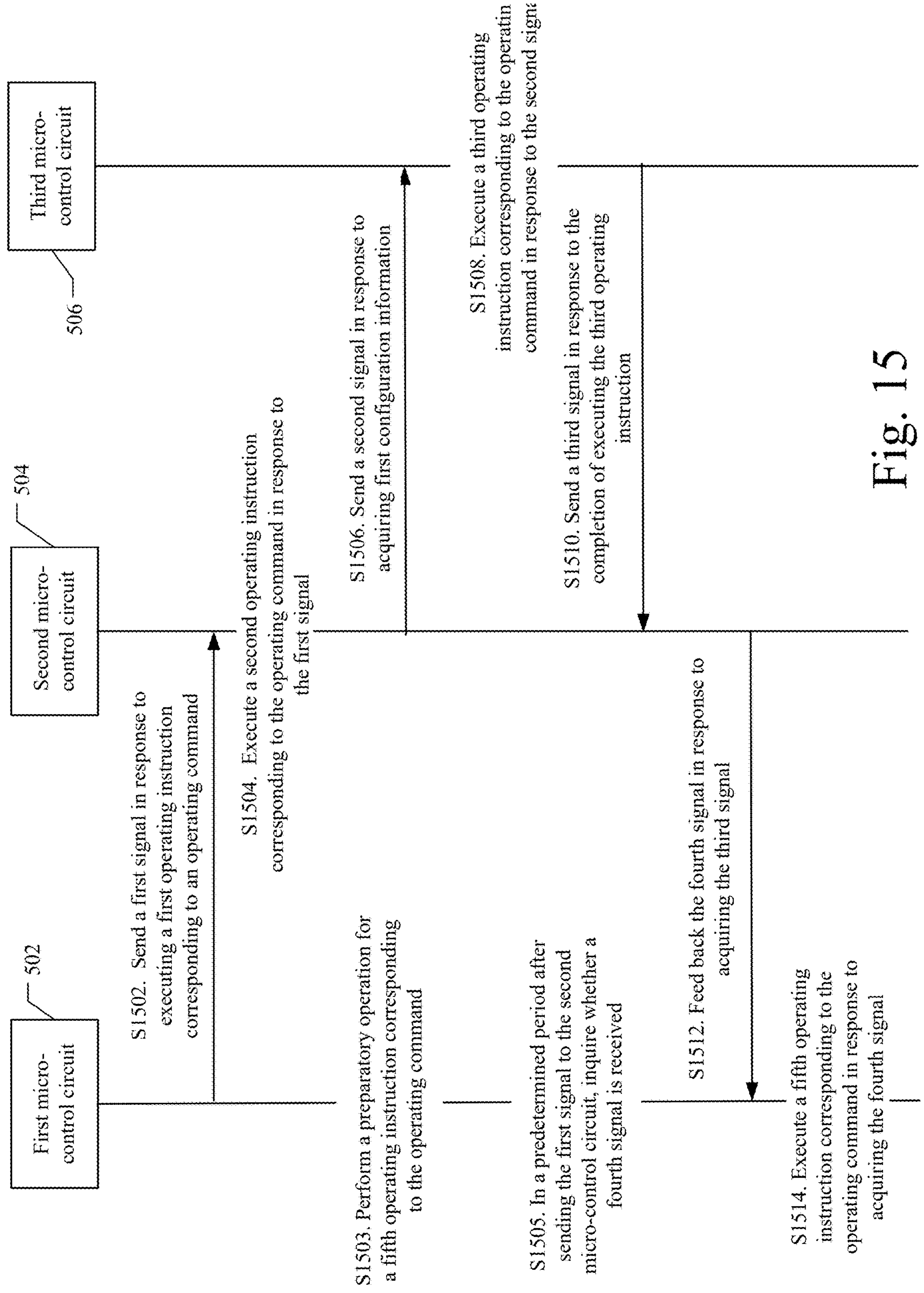
FIG. 15 is a flow diagram of still another method of operating a memory shown according to an example.

FIG. 15 is a flow diagram of still another method of operating a memory shown according to an example. On the basis of FIG. 10, FIG. 15 shows an example implementation of an operation after the first micro-control circuit sends the first signal.

Referring to FIG. 15, the method provided by the examples of the present disclosure may include the following operations.

In operation S1502, in response to executing a first operating instruction corresponding to an operating command, the first micro-control circuit 502 sends a first signal to the second micro-control circuit 504.

For an implementation of operation S1502 in some examples, a reference may be made to operation S1002.

In operation S1503, after sending the first signal to the second micro-control circuit 504, the first micro-control circuit 502 performs a preparatory operation for a fifth operating instruction corresponding to the operating command.

For an implementation of operation S1503 in some examples, a reference may be made to operation S1403.

In operation S1504, in response to the first signal, the second micro-control circuit 504 executes a second operating instruction corresponding to the operating command.

In operation S1505, in a predetermined period after sending the first signal to the second micro-control circuit 504, the first micro-control circuit 502 inquires whether a fourth signal is received.

In operation S1506, in response to acquiring first configuration information, the second micro-control circuit 504 sends a second signal to the third micro-control circuit 506.

For an implementation of operation S1506 in some examples, a reference may be made to operation S1206.

In operation S1508, in response to the second signal, the third micro-control circuit 506 executes a third operating instruction corresponding to the operating command.

In operation S1510, in response to the completion of executing the third operating instruction, the third micro-control circuit 506 sends a third signal to the second micro-control circuit 504.

In operation S1512, in response to acquiring the third signal, the second micro-control circuit 504 feeds back a fourth signal to the first micro-control circuit 502.

In operation S1514, in response to acquiring the fourth signal, the first micro-control circuit 502 executes a fifth operating instruction corresponding to the operating command.

For an implementation of operations S1504 to S1514 in some examples, a reference may be made to operations S1004 to S1014.

According to the method of operating the memory provided by the examples of the present disclosure, the second micro-control circuit sends the enable signal to the third micro-control circuit to execute the corresponding branch instruction. After the third micro-control circuit completes the executing of the third operation instruction, the third micro-control circuit sends the third signal for feeding back the completion of instruction execution to the second micro-control circuit. In response to the third signal, the second micro-control circuit feeds back the fourth signal to the first micro-control circuit to indicate that the execution of all the branch instructions corresponding to the operating instruction has been completed. In the predetermined period after sending the enable signal to the second micro-control circuit, the first micro-control circuit inquires whether the fourth signal fed back by the second micro-control circuit for indicating the completion of the branch operation is received. The first micro-control circuit does not need to inquire whether the third micro-control circuit completes the execution of the branch instruction after enabling the second micro-control circuit. That is, the time of the first micro-control circuit can be saved for preparatory work for a next instruction, thereby reducing the total time of operations such as memory programming, reading, or verification, etc.

Figure 16:
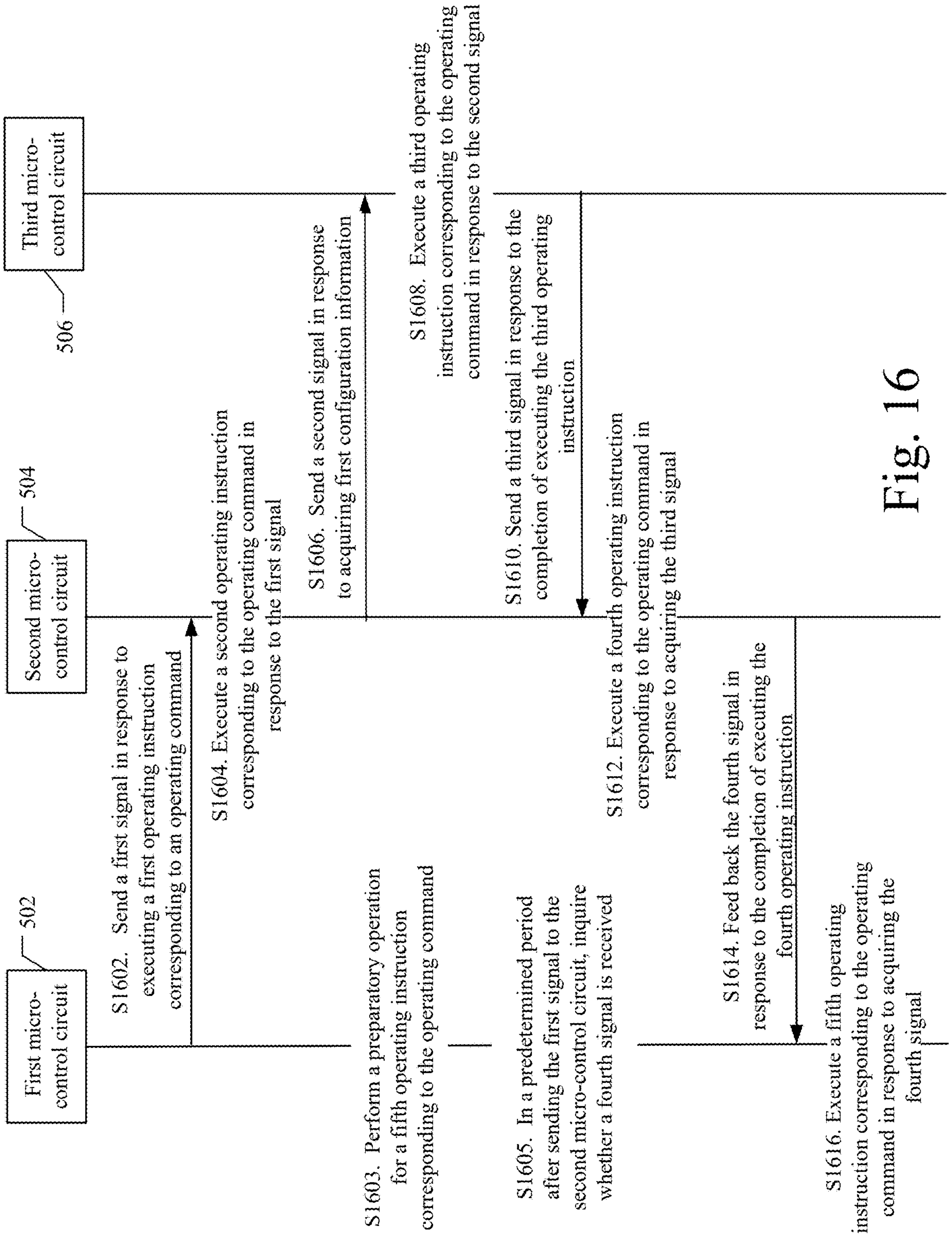
FIG. 16 is a flow diagram of still another method of operating a memory shown according to an example.

FIG. 16 is a flow diagram of still another method of operating a memory shown according to an example. On the basis of FIG. 11, FIG. 16 shows an example implementation of an operation after the first micro-control circuit sends the first signal.

Referring to FIG. 16, the method provided by the examples of the present disclosure may include the following operations.

In operation S1602, in response to executing a first operating instruction corresponding to an operating command, the first micro-control circuit 502 sends a first signal to the second micro-control circuit 504.

For an implementation of operation S1602 in some examples, a reference may be made to operation S1102.

In operation S1603, after sending the first signal to the second micro-control circuit 504, the first micro-control circuit 502 performs a preparatory operation for a fifth operating instruction corresponding to the operating command.

For an implementation of operation S1603 in some examples, a reference may be made to operation S1403.

In operation S1604, in response to the first signal, the second micro-control circuit 504 executes a second operating instruction corresponding to the operating command.

In operation S1605, in a predetermined period after sending the first signal to the second micro-control circuit 504, the first micro-control circuit 502 inquires whether a fourth signal is received.

In operation S1606, in response to acquiring first configuration information, the second micro-control circuit 504 sends a second signal to the third micro-control circuit 506.

For an implementation of operation S1606 in some examples, a reference may be made to operation S1206.

In operation S1608, in response to the second signal, the third micro-control circuit 506 executes a third operating instruction corresponding to the operating command.

In operation S1610, in response to the completion of executing the third operating instruction, the third micro-control circuit 506 sends a third signal to the second micro-control circuit 504.

In operation S1612, in response to acquiring the third signal, the second micro-control circuit 504 executes a fourth operating instruction corresponding to the operating command.

In operation S1614, in response to the completion of executing the fourth operating instruction, the second micro-control circuit 504 feeds back a fourth signal to the first micro-control circuit 502.

In operation S1616, in response to acquiring the fourth signal, the first micro-control circuit 502 executes a fifth operating instruction corresponding to the operating command.

For an implementation of operations S1604 to S1616 in some examples, a reference may be made to operations $1104 to S1116.

According to the method of operating the memory provided by the examples of the present disclosure, the second micro-control circuit sends the enable signal to the third micro-control circuit to execute the corresponding branch instruction. After the third micro-control circuit completes the executing of the third operation instruction, the third micro-control circuit sends the third signal for feeding back the completion of instruction execution to the second micro-control circuit. In response to the third signal, the second micro-control circuit executes the fourth operating instruction, and after the completion of executing the fourth operating instruction, feeds back the fourth signal to the first micro-control circuit to indicate that the execution of all the branch instructions corresponding to the operating instruction has been completed. In the predetermined period after sending the enable signal to the second micro-control circuit, the first micro-control circuit inquires whether the fourth signal fed back by the second micro-control circuit for indicating the completion of the branch operation is received. The first micro-control circuit does not need to inquire whether the third micro-control circuit completes the execution of the branch instruction after enabling the second micro-control circuit. That is, the time of the first micro-control circuit can be saved for preparatory work for a next instruction, thereby reducing the total time of operations such as memory programming, reading, or verification, etc.

Figure 17:
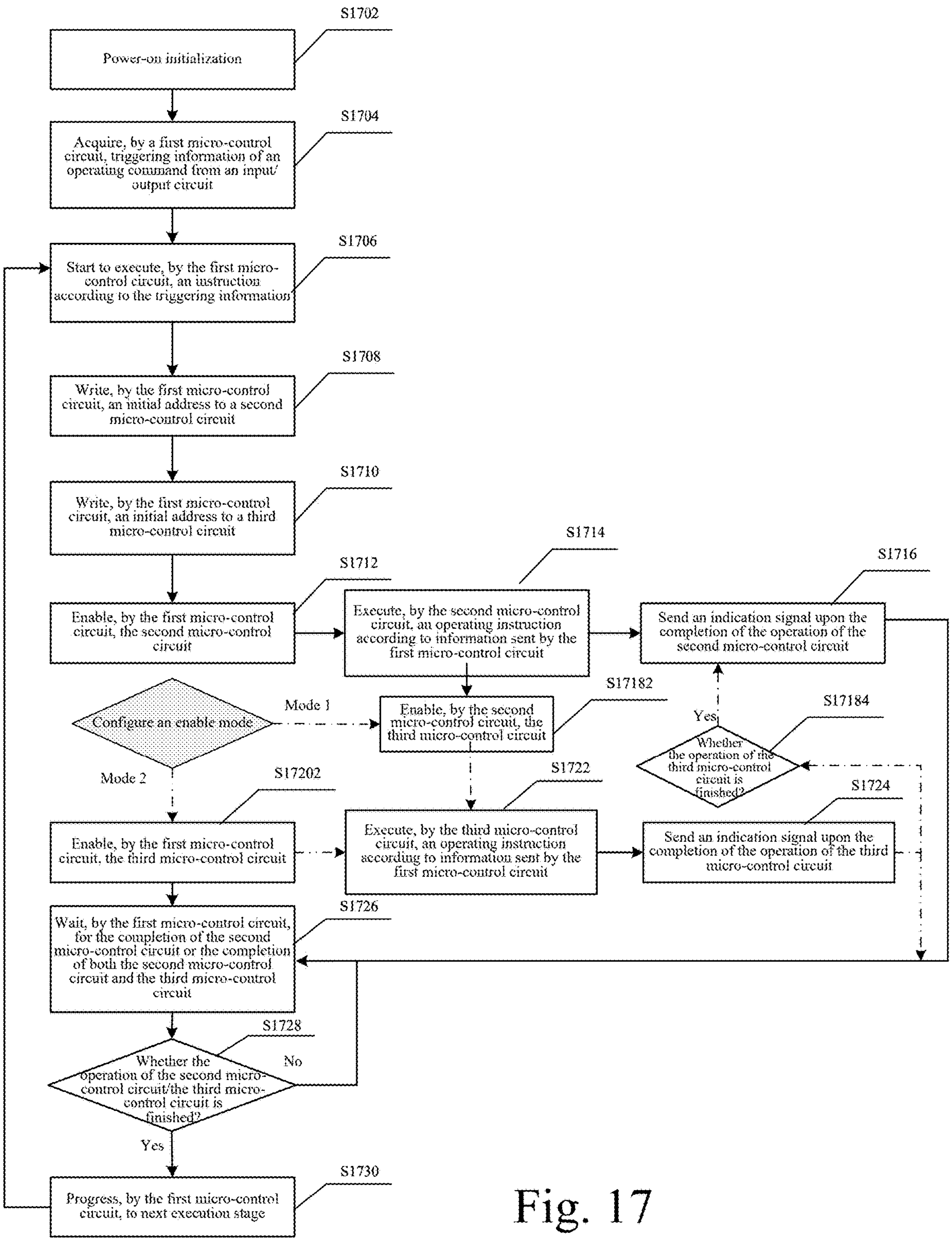
FIG. 17 is a flow diagram of executing instructions according to obtained commands by micro-control circuits shown according to FIGS. 6 to 16.

FIG. 17 is a flow diagram of executing instructions according to obtained commands by micro-control circuits shown in FIGS. 6 to 16.

As shown in FIG. 17, after power-on initialization (operation S1702), the first micro-control circuit acquires triggering information of an operating command from an input/output circuit (operation S1704), and starts to execute an instruction (operation S1706) according to the triggering information to perform the main process of a corresponding NAND operation. The first micro-control circuit first writes an initial address corresponding to the operating command to the second micro-control circuit and the third micro-control circuit (operation S1708 and operation S1710), and then enables the second micro-control circuit (operation S1712) to perform a respective branch operation (operation S1714).

In the case where an enable mode is configured as mode 1 (a configuration corresponding to first configuration information), the second micro-control circuit, when performing a corresponding branch task, enables the third micro-control circuit on demand (operation S17182) to perform data transmission (operation S1722) without the involvement of the first micro-control circuit. The first micro-control circuit may continue to execute the main task until the first micro-control circuit inquires a completion signal of the second micro-control circuit (operation S1726) immediately before the execution by the second micro-control circuit is completed. The first micro-control circuit does not need to count time and exits the main task in advance to inquire an end signal of the second micro-control circuit and then enables the third micro-control circuit. Therefore, the time for the first micro-control circuit to perform the preparatory work for a next branch operation may be increased. After completing the branch operation, the third micro-control circuit sends an indication signal to the second micro-control circuit (operation S1724). The second micro-control circuit determines whether the third micro-control circuit completes the operation according to whether the indication signal is received (operation S17184), and if the second micro-control circuit determines the completion and after determines that its branch operation is completed, the second micro-control circuit send the indication signal to the first micro-control circuit (operation S1716).

In the case where the enable mode is configured as mode 2 (a configuration corresponding to second configuration information), the enabling of the third micro-control circuit is also controlled by the first micro-control circuit (operation S17202). Enabling is not performed directly between the third micro-control circuit and the third micro-control circuit. The first micro-control circuit enables the second micro-control circuit or the third micro-control circuit, and needs to calculate a reservation time and inquire the indication signal for indicating the completion of the second micro-control circuit or the third micro-control circuit in advance. The inquiry needs to be performed multiple times and the second micro-control circuit needs to be enabled multiple times in one main process.

The first micro-control circuit waits for an indication signal for the completion of the second micro-control circuit (mode 1) or waits for an indication signal for the completion of both the second micro-control circuit and the third micro-control circuit (mode 2) (operation S1726), meanwhile the first micro-control circuit continues to perform the preparatory work for next branch operation. The first micro-control circuit inquires the indication signal for indicating the completion of the second micro-control circuit (mode 1) or the completion of the second micro-control circuit and the third micro-control circuit (mode 2) to determine whether the completion is achieved (operation S1728), and progresses to the execution stage of next main process after confirming the completion (operation S1730), e.g., returns to operation S1706. The two enable modes improve the flexibility of memory control.

The present disclosure is intended to provide a method of operating a memory, a memory, and a memory system.

Other features and advantages of the present disclosure will become apparent through the following detailed description, or will be learned in part through the practice of the present disclosure.

According to an aspect of the present disclosure, a method of operating a memory is provided, wherein the memory includes a peripheral circuit including a first micro-control circuit, a second micro-control circuit, and a third micro-control circuit. The method includes: in response to executing a first operating instruction, sending, by the first micro-control circuit, a first signal to the second micro-control circuit; in response to the first signal, executing, by the second micro-control circuit, a second operating instruction; sending, by the second micro-control circuit, a second signal to the third micro-control circuit; and in response to the second signal, executing, by the third micro-control circuit, a third operating instruction.

According to an example of the present disclosure, the method further includes: in response to the completion of executing the third operating instruction, sending, by the third micro-control circuit, a third signal to the second micro-control circuit; and in response to acquiring the third signal, feeding back, by the second micro-control circuit, a fourth signal to the first micro-control circuit.

According to an example of the present disclosure, the method further includes: in response to the completion of executing the third operating instruction, sending, by the third micro-control circuit, a third signal to the second micro-control circuit; and in response to acquiring the third signal, executing, by the second micro-control circuit, a fourth operating instruction.

According to an example of the present disclosure, the method further includes: in response to the completion of executing the fourth operating instruction, feeding back, by the second micro-control circuit, a fourth signal to the first micro-control circuit.

According to an example of the present disclosure, the method further includes: in response to acquiring the fourth signal, executing, by the first micro-control circuit, a fifth operating instruction.

According to an example of the present disclosure, the method further includes: in a predetermined period after sending the first signal to the second micro-control circuit, inquiring, by the first micro-control circuit, whether the fourth signal is received.

According to an example of the present disclosure, sending, by the second micro-control circuit, the second signal to the third micro-control circuit includes: in response to acquiring first configuration information, sending, by the second micro-control circuit, the second signal to the third micro-control circuit.

According to an example of the present disclosure, the method further includes: in response to acquiring second configuration information, sending, by the first micro-control circuit, the second signal to the third micro-control circuit.

According to an example of the present disclosure, the method further includes: in response to the completion of executing the third operating instruction, sending, by the third micro-control circuit, a third signal to the first micro-control circuit.

According to an example of the present disclosure, the method further includes: in response to the completion of executing the second operating instruction, sending, by the second micro-control circuit, a fifth signal to the first micro-control circuit.

According to an example of the present disclosure, the method further includes: in response to acquiring the third signal and acquiring the fifth signal, executing, by the first micro-control circuit, a fifth operating instruction.

According to an example of the present disclosure, sending, by the second micro-control circuit, the second signal to the third micro-control circuit includes: in response to the completion of executing the second operating instruction, sending, by the second micro-control circuit, the second signal to the third micro-control circuit.

According to an example of the present disclosure, the first micro-control circuit is a main micro-control circuit. The method further includes: acquiring, by the first micro-control circuit, triggering information for an operating command; and executing, by the first micro-control circuit, the first operating instruction according to the triggering information for the operating command.

According to an example of the present disclosure, the method further includes: in response to executing the first operating instruction, sending, by the first micro-control circuit, an initial address corresponding to the operating command to the second micro-control circuit and the third micro-control circuit. Executing, by the second micro-control circuit, the second operating instruction includes: executing, by the second micro-control circuit, the second operating instruction corresponding to the operating command based on the initial address. Executing, by the third micro-control circuit, the third operating instruction includes: executing, by the third micro-control circuit, the third operating instruction corresponding to the operating command based on the initial address.

According to an example of the present disclosure, the method further includes: after sending the first signal to the second micro-control circuit, performing, by the first micro-control circuit, a preparatory operation for a fifth operating instruction corresponding to the operating command.

According to an example of the present disclosure, the peripheral circuit includes a control logic including the first micro-control circuit, the second micro-control circuit, and the third micro-control circuit.

According to an example of the present disclosure, the peripheral circuit further includes an input/output circuit connected with the control logic. Acquiring, by the first micro-control circuit, the triggering information for the operating command includes: acquiring, by the first micro-control circuit, the triggering information for the operating command from the input/output circuit.

According to another aspect of the present disclosure, a memory is provided, including: a memory cell array; and a peripheral circuit coupled to the memory cell array and including a first micro-control circuit, a second micro-control circuit, and a third micro-control circuit, wherein: the first micro-control circuit is coupled to the second micro-control circuit, and the second micro-control circuit is coupled to the third micro-control circuit.

According to an example of the present disclosure, the peripheral circuit is configured to: in response to executing a first operating instruction, send, by the first micro-control circuit, a first signal to the second micro-control circuit; in response to the first signal, execute, by the second micro-control circuit, a second operating instruction; send, by the second micro-control circuit, a second signal to the third micro-control circuit; and in response to the second signal, execute, by the third micro-control circuit, a third operating instruction.

According to an example of the present disclosure, the peripheral circuit is further configured to: in response to the completion of executing the third operating instruction, send, by the third micro-control circuit, a third signal to the second micro-control circuit; and in response to acquiring the third signal, feed back, by the second micro-control circuit, a fourth signal to the first micro-control circuit.

According to an example of the present disclosure, the peripheral circuit is further configured to: in response to the completion of executing the third operating instruction, send, by the third micro-control circuit, a third signal to the second micro-control circuit; and in response to acquiring the third signal, execute, by the second micro-control circuit, a fourth operating instruction.

According to an example of the present disclosure, the peripheral circuit is further configured to: in response to the completion of executing the fourth operating instruction, feed back, by the second micro-control circuit, a fourth signal to the first micro-control circuit.

According to an example of the present disclosure, the peripheral circuit is further configured to: in response to acquiring the fourth signal, execute, by the first micro-control circuit, a fifth operating instruction.

According to an example of the present disclosure, the peripheral circuit is further configured to: in a predetermined period after sending the first signal to the second micro-control circuit, inquire, by the first micro-control circuit, whether the fourth signal is received.

According to an example of the present disclosure, the peripheral circuit is further configured to: in response to acquiring first configuration information, send, by the second micro-control circuit, the second signal to the third micro-control circuit.

According to an example of the present disclosure, the first micro-control circuit is coupled to the third micro-control circuit; and the peripheral circuit is further configured to: in response to acquiring second configuration information, send, by the first micro-control circuit, the second signal to the third micro-control circuit.

According to an example of the present disclosure, the peripheral circuit is further configured to: in response to the completion of executing the third operating instruction, send, by the third micro-control circuit, a third signal to the first micro-control circuit.

According to an example of the present disclosure, the peripheral circuit is further configured to: in response to the completion of executing the second operating instruction, send, by the second micro-control circuit, a fifth signal to the first micro-control circuit.

According to an example of the present disclosure, the peripheral circuit is further configured to: in response to acquiring the third signal and acquiring the fifth signal, execute, by the first micro-control circuit, a fifth operating instruction.

According to an example of the present disclosure, the peripheral circuit is further configured to: in response to the completion of executing the second operating instruction, send, by the second micro-control circuit, the second signal to the third micro-control circuit.

According to an example of the present disclosure, the first micro-control circuit is a main micro-control circuit. The peripheral circuit is further configured to: acquire, by the first micro-control circuit, triggering information for an operating command; and execute, by the first micro-control circuit, the first operating instruction according to the triggering information for the operating command.

According to an example of the present disclosure, the peripheral circuit is further configured to: in response to executing the first operating instruction corresponding to the operating command, send, by the first micro-control circuit, an initial address corresponding to the operating command to the second micro-control circuit and the third micro-control circuit; execute, by the second micro-control circuit, the second operating instruction corresponding to the operating command based on the initial address; and execute, by the third micro-control circuit, the third operating instruction corresponding to the operating command based on the initial address.

According to an example of the present disclosure, the peripheral circuit is further configured to: after sending the first signal to the second micro-control circuit, perform, by the first micro-control circuit, a preparatory operation for a fifth operating instruction corresponding to the operating command.

According to an example of the present disclosure, the peripheral circuit includes a control logic including the first micro-control circuit, the second micro-control circuit, and the third micro-control circuit.

According to an example of the present disclosure, the peripheral circuit further includes an input/output circuit connected with the control logic and configured to obtain triggering information according to the operating command. The peripheral circuit is further configured to: acquire, by the first micro-control circuit, the triggering information from the input/output circuit.

According to further another aspect of the present disclosure, a memory is provided, including: a memory cell array; and a peripheral circuit coupled to the memory cell array and including a first micro-control circuit, a second micro-control circuit, and a third micro-control circuit, wherein the peripheral circuit is configured to: in response to executing a first operating instruction, send, by the first micro-control circuit, a first signal to the second micro-control circuit; in response to the first signal, execute, by the second micro-control circuit, a second operating instruction; send, by the second micro-control circuit, a second signal to the third micro-control circuit; and in response to the second signal, execute, by the third micro-control circuit, a third operating instruction.

According to yet another aspect of the present disclosure, a memory system is provided, including any memory described above and a controller coupled with the memory.

It should be understood that, the above general description and the following detailed description are merely examples, and cannot limit the present disclosure.

The example implementations of the present disclosure are illustrated and described above. It should be understood that, the present disclosure is not limited to the detailed structures, configuration modes, or implementations described herein; rather, the present disclosure is intended to cover a variety of modifications and equivalent configurations encompassed within the spirit and scope of the appended claims.

What is claimed is:

1. A method of operating a memory, wherein the memory includes a peripheral circuit including a first micro-control circuit, a second micro-control circuit, and a third micro-control circuit, the first micro-control circuit to control operations of the second micro-control circuit and the second micro-control circuit to control operations of the third micro-control circuit based on branch instructions corresponding to an operating instruction executed by the first micro-control circuit, the method including:

in response to executing the operating instruction, sending, by the first micro-control circuit, a first signal to the second micro-control circuit, the first signal corresponding to a first branch instruction to execute the operating instruction;

in response to the first signal, executing, by the second micro-control circuit, the first branch instruction, the second micro-control circuit to control operation of a memory cell array of the memory based on the first branch instruction, and wherein, after execution of the first branch instruction, the first micro-control circuit receives a feedback signal from the second micro-control circuit indicating a completion of the first branch instruction, the completion of the first branch instruction corresponding to an availability of the first micro-control circuit to execute another operating instruction;

sending, by the second micro-control circuit, a second signal to the third micro-control circuit, the second signal corresponding to a second branch instruction to execute the operating instruction; and in response to the second signal, executing, by the third micro-control circuit, the second branch instruction, the third micro-control circuit to transmit data related to execution of the first branch instruction through a page buffer of the memory based on the second branch instruction for storage in the memory cell array.

2. The method of claim 1, further including:

in response to a completion of executing the second branch instruction, sending, by the third micro-control circuit, a third signal to the second micro-control circuit; and in response to acquiring the third signal, feeding back, by the second micro-control circuit, a fourth signal to the first micro-control circuit.

3. The method of claim 1, further including:

in response to a completion of executing the second branch instruction, sending, by the third micro-control circuit, a third signal to the second micro-control circuit; and in response to acquiring the third signal, executing, by the second micro-control circuit, a fourth branch instruction.

4. The method of claim 3, further including, in response to a completion of executing the fourth branch instruction, feeding back, by the second micro-control circuit, a fourth signal to the first micro-control circuit.

5. The method of claim 2, further including, in response to acquiring the fourth signal, executing, by the first micro-control circuit, the another operating instruction.

6. The method of claim 5, further including, in a predetermined period after sending the first signal to the second micro-control circuit, inquiring, by the first micro-control circuit, whether the fourth signal is received.

7. The method of claim 1, wherein sending, by the second micro-control circuit, the second signal to the third micro-control circuit comprises, in response to acquiring configuration information, sending, by the second micro-control circuit, the second signal to the third micro-control circuit.

8. The method of claim 7, wherein the configuration information is first configuration information, and further including, in response to acquiring second configuration information, sending, by the first micro-control circuit, the first signal to the second micro-control circuit.

9. The method of claim 1, further including, in response to a completion of executing the second branch instruction, sending, by the third micro-control circuit, a third signal to the first micro-control circuit.

10. The method of claim 9, further including, in response to the completion of executing the first branch instruction, sending, by the second micro-control circuit, a fifth signal to the first micro-control circuit.

11. The method of claim 10, further including, in response to acquiring the third signal and acquiring the fifth signal, executing, by the first micro-control circuit, the another operating instruction.

12. The method of claim 1, wherein sending, by the second micro-control circuit, the second signal to the third micro-control circuit comprises, in response to the completion of executing the first branch instruction, sending, by the second micro-control circuit, the second signal to the third micro-control circuit.

13. The method of claim 1, wherein the first micro-control circuit is a main micro-control circuit, the method further including:

acquiring, by the first micro-control circuit, triggering information for an operating command; and executing, by the first micro-control circuit, the operating instruction according to the triggering information for the operating command.

14. The method according to claim 13, further including, in response to executing the operating instruction, sending, by the first micro-control circuit, an initial address corresponding to branch instructions for the operating command to the second micro-control circuit and the third micro-control circuit, wherein executing, by the second micro-control circuit, the first branch instruction includes executing, by the second micro-control circuit, the first branch instruction corresponding to the operating command based on the initial address, and wherein executing, by the third micro-control circuit, the second branch instruction includes executing, by the third micro-control circuit, the second branch instruction corresponding to the operating command based on the initial address.

15. The method of claim 14, further including, after sending the first signal to the second micro-control circuit, performing, by the first micro-control circuit, a preparatory operation for the another operating instruction corresponding to the operating command.

16. The method of claim 13, wherein the peripheral circuit includes a control logic including the first micro-control circuit, the second micro-control circuit, and the third micro-control circuit.

17. The method of claim 16, wherein the peripheral circuit further includes an input/output circuit connected with the control logic, and wherein acquiring, by the first micro-control circuit, the triggering information for the operating command includes acquiring, by the first micro-control circuit, the triggering information for the operating command from the input/output circuit.

18. A memory, including:

a memory cell array; and a peripheral circuit coupled to the memory cell array and including a first micro-control circuit, a second micro-control circuit, and a third micro-control circuit, wherein the first micro-control circuit is coupled to the second micro-control circuit, and the second micro-control circuit is coupled to the third micro-control circuit, the first micro-control circuit to control operations of the second micro-control circuit and the second micro-control circuit to control operations of the third micro-control circuit based on branch instructions corresponding to an operating instruction executed by the first micro-control circuit, and the peripheral circuit is configured to:

in response to executing the operating instruction, send, by the first micro-control circuit, a first signal to the second micro-control circuit, the first signal corresponding to a first branch instruction to execute the operating instruction;

in response to the first signal, execute, by the second micro-control circuit, the first branch instruction, the second micro-control circuit to control operation of components of the memory cell array of the memory based on the first branch instruction, and wherein, after execution of the first branch instruction, the first micro-control circuit receives a feedback signal from the second micro-control circuit indicating a completion of the first branch instruction, the completion of the first branch instruction corresponding to an availability of the first micro-control circuit to execute another operating instruction;

send, by the second micro-control circuit, a second signal to the third micro-control circuit, the second signal corresponding to a second branch instruction to execute the operating instruction; and in response to the second signal, execute, by the third micro-control circuit, the second branch instruction, the third micro-control circuit to transmit data related to execution of the first branch instruction through a page buffer of the memory based on the second branch instruction for storage in the memory cell array.

19. The memory of claim 18, wherein the peripheral circuit is configured to:

in response to executing the operating instruction, send, by the first micro-control circuit, an initial address corresponding to branch instructions for the operating instruction to the second micro-control circuit and the third micro-control circuit, wherein executing, by the second micro-control circuit, the first branch instruction includes executing, by the second micro-control circuit, the first branch instruction corresponding to the operating instruction based on the initial address, and wherein executing, by the third micro-control circuit, the second branch instruction includes executing, by the third micro-control circuit, the second branch instruction corresponding to the operating instruction based on the initial address.

20. A memory system, including:

a memory including:

a memory cell array; and a peripheral circuit coupled to the memory cell array and including a first micro-control circuit, a second micro-control circuit, and a third micro-control circuit, the first micro-control circuit to control operations of the second micro-control circuit and the second micro-control circuit to control operations of the third micro-control circuit based on branch instructions corresponding to an operating instruction executed by the first micro-control circuit, wherein the peripheral circuit is configured to:

in response to executing the operating instruction, send, by the first micro-control circuit, a first signal to the second micro-control circuit, the first signal corresponding to a first branch instruction to execute the operating instruction;

in response to the first signal, execute, by the second micro-control circuit, the first branch instruction, the second micro-control circuit to control operation of components of the memory cell array of the memory based on the first branch instruction, and wherein, after execution of the first branch instruction, the first micro-control circuit receives a feedback signal from the second micro-control circuit indicating a completion of the first branch instruction, the completion of the first branch instruction corresponding to an availability of the first micro-control circuit to execute a subsequent operating instruction;

send, by the second micro-control circuit, a second signal to the third micro-control circuit, the second signal corresponding to a second branch instruction to execute the operating instruction; and in response to the second signal, execute, by the third micro-control circuit, the second branch instruction, the third micro-control circuit to transmit data related to execution of the first branch instruction through a page buffer of the memory based on the second branch instruction for storage in the memory cell array; and a controller coupled with the memory.

* * * * *